(12) United States Patent
Eliezer et al.

(10) Patent No.: US 8,218,487 B2
(45) Date of Patent: Jul. 10, 2012

(54) SYSTEM AND METHOD OF ADAPTIVE FREQUENCY HOPPING WITH LOOK AHEAD INTERFERENCE PREDICTION

(75) Inventors: Oren E. Eliezer, Plano, TX (US); Yossi Tsfati, Rishon, Le Zion (IL)

(73) Assignee: Texas Instruments Incorporated, Dallas, TX (US)

( * ) Notice: Subject to any disclaimer, the term of this patent is extended or adjusted under 35 U.S.C. 154(b) by 842 days.

(21) Appl. No.: 12/100,376

(22) Filed: Apr. 9, 2008

(65) Prior Publication Data

US 2009/0257396 A1    Oct. 15, 2009

(51) Int. Cl.
*H04W 4/00* (2009.01)

(52) U.S. Cl. .................................................. 370/329

(58) Field of Classification Search .......... 370/328–339; 375/130–137; 455/1, 422.1, 426.1
See application file for complete search history.

(56) References Cited

U.S. PATENT DOCUMENTS

| | | | | |
|---|---|---|---|---|
| 6,115,407 | A * | 9/2000 | Gendel et al. | 375/132 |
| 6,643,278 | B1 * | 11/2003 | Panasik et al. | 370/330 |
| 7,027,418 | B2 * | 4/2006 | Gan et al. | 370/329 |
| 7,092,428 | B2 | 8/2006 | Chen et al. | 375/132 |
| 7,116,699 | B2 | 10/2006 | Batra et al. | 375/132 |
| 7,269,151 | B2 * | 9/2007 | Diener et al. | 370/329 |
| 2002/0021746 | A1 | 2/2002 | Schmidl et al. | 375/132 |
| 2003/0058829 | A1 | 3/2003 | Batra | 370/345 |
| 2008/0288845 | A1 * | 11/2008 | Tsfati et al. | 714/748 |

FOREIGN PATENT DOCUMENTS

GB    2406479    *    3/2005

OTHER PUBLICATIONS

Chek et al, Design and evaluation of practical coexistence management schemes for Bluetooth and IEEE 802.11b systems, IEEE, 18 pages, 2007.*
Michael et al, Adaptive Frequency Hopping for FHSS System, IEEE, 24 pages, Mar. 2001.*
U.S. Appl. No. 10/003,864, filed Nov. 2, 2001.
U.S. Appl. No. 10/004,304, filed Nov. 2, 2001.
U.S. Appl. No. 10/368,490.
U.S. Appl. No. 11/113,285.
U.S. Appl. No. 11/369,318.

* cited by examiner

*Primary Examiner* — Frank Duong
(74) *Attorney, Agent, or Firm* — Ronald O. Neerings; Wade James Brady, III; Frederick J. Telecky, Jr.

(57) ABSTRACT

A novel and useful adaptive frequency hopping scheme for wireless devices and networks operating in a congested environment of similar devices, where capacity maximization is desired. The hopping sequence of each wireless link is dynamically adapted such that the impact of the surrounding interference is minimized and the interference induced onto the coexisting systems is also minimized. The scheme detects the repetitive presence of interference on a particular channel and comprises a replacement mechanism for swapping the interfered frequency-channel with one that would be clear for that particular time-slot. The mechanism detects interference during a redundant portion of the transmission (i.e. header or trailer) without having to experience packet failures (i.e. data loss). If the interference impact (e.g. corrupted header bits) exceeds a predefined threshold, that frequency channel is declared temporarily unusable for that time slot and is replaced with another in accordance with a frequency replacement policy. Periodic interference at a particular frequency, originating from a coexisting system of similar operating parameters, may also be detected at instances that are distant from the timeslots for which that particular frequency is to be used, such that frequency replacement in the hopping sequence can be scheduled ahead of time and collisions would be avoided altogether.

18 Claims, 9 Drawing Sheets

SYSTEM AND METHOD OF ADAPTIVE FREQUENCY HOPPING WITH LOOK AHEAD INTERFERENCE PREDICTION

FIELD OF THE INVENTION

The present invention relates to the field of data communications and more particularly relates to an adaptive frequency hopping system and method with look-ahead interference prediction suitable for use in wireless frequency hopping bidirectional systems employing fixed time-slot based communications.

BACKGROUND OF THE INVENTION

Bluetooth is a worldwide specification for a small low-cost radio targeting various short-range wireless connectivity applications. Bluetooth networks are intended to link mobile computers, mobile phones, other portable handheld devices and provide Internet connectivity. The Bluetooth standard uses a packet switching protocol employing frequency hopping spread spectrum (FHSS) at 1600 hops/sec with a current maximum data rate of 3 Mb/s, which is referred to as the "Enhanced Data Rate" (EDR), as it was a later extension to the basic rate of 1 Mb/s from the time the Bluetooth standard was first introduced. Bluetooth radios operate worldwide in the 2.4 GHz unlicensed Industrial Scientific Medicine (ISM) band using a frequency range of 2402-2480 MHz. For carrier frequencies, the following relation holds $$f=2402+k[\text{MHz}], k=0,\ldots,78 \tag{1}$$

A total of 79 RF channels may be used in this frequency band. The RF bandwidth of each channel is about 1 MHz.

A frequency hopping transceiver is used to combat interference and fading. The symbol rate is 1 Ms/s, corresponding to a bit rate of 1 Mb/s, 2 Mb/s or 3 Mb/s. For full duplex transmission, a Time-Division Duplex (TDD) scheme is used wherein information is exchanged through packets in the two directions alternately. Each packet is transmitted on a different hop frequency. A packet nominally covers a single slot, but can also be extended to cover three or five slots.

The slotted channel is divided into time slots, each having a nominal slot length of 625 μs. The time slots are numbered according to the Bluetooth clock of the piconet master. The slot numbering ranges from 0 to $2^{27}-1$ and is cyclic with a cycle length of $2^{27}$. In a Bluetooth piconet, which is a network of multiple synchronized devices, one device, dictating the timing, is defined as the master, and up to seven others may be acting as its slave devices, and adapt to this timing. The master transmits to a slave (or broadcasts to multiple slaves simultaneously) in even-numbered time slots only, and a slave may transmit back to the master in odd-numbered time slots only. The packet start is aligned with the slot start and timing compensation is continuously engaged in all active slaves to maintain synchronization with the time-slot timing dictated by the master.

Bluetooth transceivers use a time-division duplex (TDD) scheme to communicate, alternately transmitting and receiving in a synchronous manner. The piconet is synchronized by the system clock of the master. The Bluetooth Device Address (BD_ADDR) of the master determines the frequency hopping sequence and the channel access code. The system clock of the master determines the phase in the hopping sequence. The master controls the traffic on the channel by a polling scheme. The slaves adapt their native clocks with a timing offset in order to match the master clock.

The channel is represented by a pseudo-random hopping sequence hopping through all 79 RF channels or a modified limited hopping sequence which offers enhanced coexistence performance. The hopping sequence is unique for the piconet and is determined by the Bluetooth device address of the master; the phase in the hopping sequence is determined by the Bluetooth clock of the master. The channel is divided into time slots where each slot corresponds to an RF hop frequency. Consecutive hops correspond to different RF hop frequencies. The nominal hop rate is 1600 hops/s. All Bluetooth units participating in the piconet are time and hop synchronized to the channel.

A problem arises, however, in that the number of devices operating in the 2.4 GHz unlicensed band is increasing at an ever faster rate causing an increased likelihood of congestion. This results in increased interference caused by one wireless system to other wireless systems operating in proximity. In the case of Bluetooth piconets, it is often necessary to collocate many independent coexisting Bluetooth piconets within the same environment where frequent packet collisions between the piconets could significantly degrade their performance.

It is often the case that multiple wireless systems operate close enough to each other to potentially affect one another resulting in noticeably degraded performance for one or more of them. An example is shown in FIG. 1 where a Bluetooth system 10 operates in the vicinity of a wireless LAN (WLAN) system 20. A plurality of Bluetooth devices 12 acting as slave devices and one Bluetooth device 14 acting as a master form a piconet. The wireless LAN 20 comprises a plurality of wireless devices 24, such as 802.11b (WLAN) devices, and an access point 22.

As described above, Bluetooth is a frequency hopping system and uses fixed length packets transmitted during well-defined time slots in a TDMA fashion. Packets are transmitted in the ISM band between 2402 and 2480 MHz (79 defined channels with 1 MHz channel spacing, i.e. bandwidth). Thus, Bluetooth uses virtually the entire 2400-2483.5 MHz band, which is a disadvantage due to the high potential for interference. The original motivation for a large number of channels was to spread transmission energy over as many channels as possible, thus maximizing the energy spread. Such a scheme is advantageous in and was originally developed for military systems in which it is desirable to prevent eavesdropping and frequency pattern detection by the enemy.

Consider the example prior art system 40 of FIG. 2. System A comprises a master device 42 that transmits to receiving slave device 44. Similarly, system B comprises a master device 46 that transmits to receiving slave device 48. Different systems (i.e. A and B) coexisting in the same environment are likely to interfere with each other with a probability that increases the more systems there are. Thus, two systems located in an environment that is very dense with frequency hopping systems, are likely to be at different frequencies at most times. There is a probability, however, that at some instance they will be at the same frequency and potentially interfere with each other such as shown in FIG. 3.

For example, the packet stream 30 transmitted by system A eventually interferes with the packet stream 32 transmitted by system B. The collision eventually occurs due to the drift of the crystal oscillator in each device. Assuming both clocks are drifting apart in opposite directions, eventually, the trailer of one packet will overlap with the header of another packet, depending on the difference in their clock frequencies. Theoretically, two systems can maintain the same relative timing indefinitely, but in practice, since they are not synchronized and each system uses its own crystal oscillator, their relative timing will drift over time.

Note that coexisting systems would never interfere or collide with each other if each used an entirely different set of frequencies. At some point, however, the available frequencies will be exhausted and collisions will inevitably occur. Bluetooth, in its original definition, required the use of all 79 channels, 2402 MHz to 2480 MHz with 1 MHz spacing. It was required to utilize all channels in some pseudo-random order. Thus, coexisting systems had to overlap each other at some points in time, potentially resulting in interference.

Historically, FCC regulations mandated the use of at least 75 hopping frequencies in the 2.4 GHz ISM band, which forced this choice (not shared in other regions such as France and Japan at the time, where the hop-sequence was defined with only 23 channels). The power spectral density, however, is instantaneously very high in a frequency hopping spread spectrum transmission. It is only over time, that the energy is spread out over the band in a frequency hopping system, and therefore in many coexistence scenarios, the use of a greater number of hopping frequencies is problematic rather than being advantageous.

Consider a victim system such as the WLAN system 20 that transmits very long packets and uses a large amount of bandwidth compared to the Bluetooth system. The drawback in this coexistence scenario is if a WLAN packet experiences interference, it typically must be retransmitted. If only a portion of the packet is corrupted, the number of retransmissions will typically depend on the particular protocol employed, interleaving, coding, etc. Whether the packet is interfered with for a short time may not reduce the need for retransmission. Thus, Bluetooth transmissions and other frequency hopping schemes like it, can potentially create noticeable interference for other wireless systems because of the large amount of energy instantaneously concentrated in a narrow bandwidth over the entire band of frequencies, thus often making coexistence with other systems problematic.

One solution is to segment long packets into many smaller ones. The disadvantage with this is the increased transmission overhead required for packet headers, trailers, etc. in addition to the processing resources requirement.

Conventional frequency hopping techniques encourage the maximization of the number of hopping channels used as well as the randomization in the hopping sequence, since frequency hopping is typically associated with secure communications (i.e. the avoidance of intentional jamming and eavesdropping). Other than in military applications, however, these properties are not necessarily required. In non-military applications, the goal is simply to transport information from one location to another, possibly in the presence of coexisting systems and multipath fading. Prior art solutions in Bluetooth make use of the original 79-channel complex hopping sequence. These prior art schemes (1) fail to coexist better when a neighboring system is not detected (which is a scenario of high likelihood), (2) do not accommodate for frequency reuse among many coexisting piconets, based on time-axis avoidance, and (3) are not capable of determining which channels are shared between coexisting Bluetooth piconets, since collisions at a specific frequency will not necessarily be repetitive.

SUMMARY OF THE INVENTION

The present invention provides a solution to the problems of the prior art by providing an adaptive frequency hopping scheme that optimizes spectrum sharing amongst multiple independent frequency-hopping users thereby maximizing the capacity (number of simultaneous coexisting links). The invention is applicable to frequency hopping systems which are synchronous in nature (i.e. have specific fixed time-slots defined for transmission and reception), such as the Bluetooth radio system. The invention can be used to dynamically adapt a set of hopping frequencies to a particular environment whereby channels that are experiencing interference or that could potentially experience repetitive interference are replaced with clear channels. Thus, the performance of the wireless system and that of other coexisting wireless systems within the same environment is greatly enhanced.

The present invention provides a set of parameters and techniques that are described along with a mechanism for the detection and replacement of interfered channels. It should be noted that the invention is applicable to many other systems and for a wide range of parameters. The invention is operative to quickly detect shared channels experiencing interference sufficient to cause a noticeable impact on a redundant portion in a received packet wherein a hit on the redundant portion does not typically degrade the payload reception performance. The present invention uses the packet header and trailer as indicators of upcoming collisions that have yet to hit the payload. A predictive look ahead scheme for improving capacity in multiple independent communications systems is also provided, which is operative to predict potential repetitive interference that could occur as the relative timing of two systems drifts such that in a particular time-slot they would both be using the same frequency in their hopping sequences and could thus potentially interfere with one another.

In response, a new frequency is assigned thus avoiding performance degradation before it would otherwise occur. Further, the frequency reuse mechanism of the present invention enables the coexistence of multiple frequency hopping systems with minimal interference, thus maximizing capacity without necessitating direct frequency-use coordination between the coexisting systems, which is often difficult or impossible to accommodate.

The invention is operative to exploit a rule change by the FCC which permits a reduction in the minimum number of channels required in a frequency hopping system to as few as 15 for the 2.4 GHz ISM band. In response to this change, version 1.2 of the Bluetooth specification allows the reduction in the number of hopping channels. The adaptive frequency hopping scheme of the invention makes use of this to effectively address the congestion problem caused by multiple radio devices operating in the same environment.

The examples presented herein are for illustration purposes and are not intended to limit the scope of the invention. It should be noted that the present invention is applicable to any frequency hopping communication system of similar nature (employing fixed time-slots) and is not limited to the Bluetooth standard for WPANs. For example, in Ultra-Wideband (UWB) short range connectivity, where frequency hopping may also be employed, the present invention may be employed to further increase capacity in congested environments where multiple devices of the same type must coexist.

In operation, each frequency in the hopset has a corresponding channel failure counter that tracks the number of packet failures experienced on each particular frequency. In accordance with the present invention, a packet failure is typically not an event in which the payload was erroneous, but one in which a redundant portion of the packet at its boundaries was erroneous (i.e. header and/or trailer). Increment and decrement values configured in a register are used to increase or to decrease the counter value after each packet is received.

The channel failure counter is incremented when a packet failure occurs and is decremented when a packet is received successfully. If the number of failures exceeds a threshold, the channel is marked as 'bad' and a frequency replacement procedure is initiated. The frequency replacement procedure functions to substitute a clear frequency for the interfered frequency in the channel hopset.

The invention also provides for the accelerated replacement of those channels that cause more noticeable performance degradation by detecting the occurrence of predetermined events, such as multiple consecutive reception failures. The invention serves to address both the need to coexist with systems of different spectral usage characteristics (e.g., fixed carrier frequency), as well as with systems employing frequency hopping with the same time-slotting and hop-sequence length, which is where it offers the most significant benefit and may be used in a predictive mode, where the interference is avoided before it actually occurs.

In another embodiment, the potential periodic interference at a particular frequency, originating from a coexisting system of similar operating parameters, can be detected at instances that are distant from the timeslots for which that particular frequency is to be used, such that frequency channel replacement in the hopping sequence can be scheduled in advance so as to avoid collisions altogether. The rate at which periodic interference from a similar type of system approaches the time slots, where it creates interference for the victim system, depends on the frequency difference between their respective clock references, which are typically crystal based. Hence, the rate of relative drift is typically slow with respect to the time slots used for the transmission of the data packets, thereby allowing channel adaptation to be based on the reception of multiple packets over multiple cycles of the hop sequence.

Note that many aspects of the invention described herein may be constructed as software objects that are executed in embedded devices as firmware, software objects that are executed as part of a software application on either an embedded or non-embedded computer system such as a digital signal processor (DSP), microcomputer, minicomputer, microprocessor, etc. running a real-time operating system such as WinCE, Symbian, OSE, Embedded LINUX, etc. or non-real time operating system such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

There is thus provided in accordance with the invention, a method of adapting a periodic frequency hopping sequence in a frequency hopping communication system having fixed slot timing, the method comprising the steps of detecting the presence of repeated interference at a particular frequency having specific timing with respect to time slots at which that particular frequency is periodically used by the system and replacing the potentially interfered frequency of the time slot with a replacement frequency.

There is also provided in accordance with the invention, a method of adapting a frequency hopping sequence in a frequency hopping communication system having a plurality of frequency channels, the method comprising the steps of detecting an impact on a transmitted packet causing corruption of one or more bits in a redundant portion of the transmitted packet, declaring the particular channel unusable if the impact exceeds a threshold and replacing the frequency of an unusable channel with an alternate frequency.

There is further provided in accordance with the invention, a method of adaptive frequency hopping for use in a frequency hopping communication system, the method comprising the steps of maintaining a channel frequency counter for each individual frequency in a hopset, incrementing the channel frequency counter associated with a particular frequency upon occurrence of a predetermined event and if the value of a channel frequency counter associated with a particular frequency exceeds a threshold, replacing an interfered channel corresponding thereto with a clear channel.

There is also provided in accordance with the invention, a mobile communications device for use in a frequency hopping communication system having a plurality of frequency channels comprising a frequency hopping based radio transceiver, a processor coupled to the transceiver, the processor operative to detect the presence of repeated interference at a particular frequency having specific timing with respect to time slots at which that particular frequency is periodically used by the transceiver and replace the potentially interfered frequency of the time slot with a replacement frequency.

There is further provided in accordance with the invention, a method of adapting a periodic frequency hopping sequence in a frequency hopping communication system having fixed slot timing, the method comprising the steps of detecting the presence of potential periodic interference from transmissions by neighboring coexisting systems occurring at a frequency assigned to a time slot to occur in the future in the potentially interfered system and having specific timing with respect to time slots at which the frequency is used by the system, determining a drift in relative timing between the periodic transmissions and the timing at which the system periodically uses the frequency and declaring the particular frequency unusable if the detected level of the periodic transmissions repeatedly exceeds a first predefined threshold, and replacing the unusable frequency with a replacement frequency.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
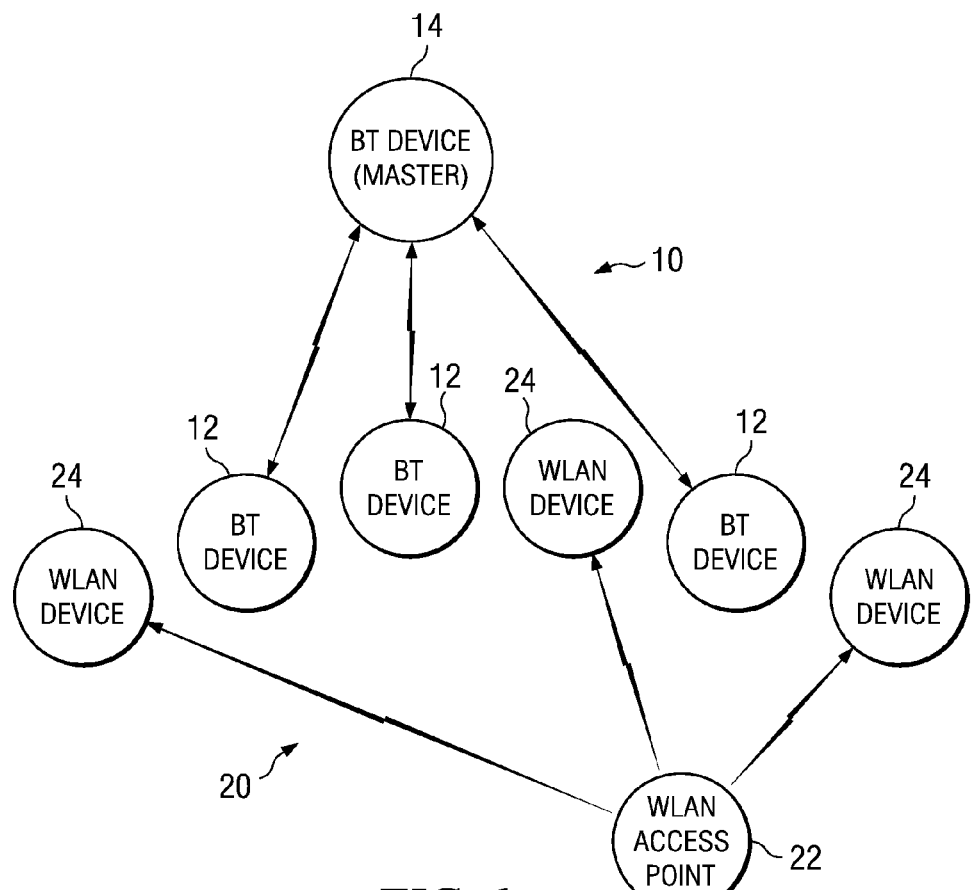
FIG. 1 is a block diagram illustrating an example prior art Bluetooth piconet and Wireless Local Area Network (WLAN)

The following notation is used throughout this document.
Term Definition
AC Alternating Current
ASIC Application Specific Integrated Circuit
AVI Audio Video Interleave
BMP Windows Bitmap
CPU Central Processing Unit
DC Direct Current
DSP Digital Signal Processor
EDR Enhanced Data Rate
EPROM Erasable Programmable Read Only Memory
FCC Federal Communications Commission
FHSS Frequency Hopping Spread Spectrum
FIFO First-In First-Out
FM Frequency Modulation
FPGA Field Programmable Gate Array
GPS Ground Positioning Satellite
HDL Hardware Description Language
IEEE Institute of Electrical and Electronics Engineers
IF Intermediate Frequency
ISM Industrial Scientific Medical
JPG Joint Photographic Experts Group
LAN Local Area Network
MP3 MPEG-1 Audio Layer 3
MPG Moving Picture Experts Group
OFDM Orthogonal Frequency Division Multiplexing
PC Personal Computer
PDA Portable Digital Assistant
PER Packet Error Rate
RAM Random Access Memory
RF Radio Frequency
ROM Read Only Memory
RSSI Received Signal Strength Indication
SIM Subscriber Identity Module
TDD Time Division Duplex
TDMA Time Division Multiple Access
USB Universal Serial Bus
UWB Ultra Wideband
WiFi Wireless Fidelity
WiMAX Worldwide Interoperability for Microwave Access
WiMedia Radio platform for UWB
WLAN Wireless Local Area Network
WMA Windows Media Audio
WMV Windows Media Video
WPAN Wireless Personal Area Network

DETAILED DESCRIPTION OF THE INVENTION

The present invention provides a solution to the problems of the prior art by providing an adaptive frequency hopping scheme that optimizes spectrum sharing amongst multiple independent frequency-hopping users thereby maximizing the capacity (number of simultaneous coexisting links). The invention is applicable to frequency hopping systems which are synchronous in nature (i.e. have specific fixed time-slots defined for transmission and reception), such as the Bluetooth radio system. The invention can be used to dynamically adapt a set of hopping frequencies to a particular environment whereby channels experiencing interference are replaced with clear channels. Thus, the performance of the wireless system and that of other coexisting wireless systems within the same environment is greatly enhanced.

The present invention provides a set of parameters and techniques that are described along with a mechanism for the detection and replacement of interfered channels. It should be noted that the invention is applicable to many other systems and for a wide range of parameters. The invention is operative to quickly detect shared channels experiencing interference sufficient to cause a noticeable impact on a redundant portion in a received packet wherein a hit on the redundant portion does not typically degrade the payload reception performance. In response, a new frequency is assigned thus avoiding performance degradation. Further, the frequency reuse mechanism of the present invention enables the coexistence of multiple frequency hopping systems with minimal interference, thus maximizing capacity without necessitating direct frequency-use coordination between the coexisting systems.

Note that throughout this document, the term communications device is defined as any apparatus or mechanism adapted to transmit, receive or transmit and receive data through a medium. The communications device may be adapted to communicate over any suitable medium such as RF, wireless, infrared, optical, wired, microwave, etc. In the case of wireless communications, the communications device may comprise an RF transmitter, RF receiver, RF transceiver or any combination thereof. The term "communications transceiver" or "communications device" is defined as any apparatus or mechanism adapted to transmit and receive data through a medium. The communications device or communications transceiver may be adapted to communicate over any suitable medium, including wireless or wired media. Examples of wireless media include RF, infrared, optical, microwave, UWB, Bluetooth, WiMax, WiMedia, WiFi, or any other broadband medium, etc. Examples of wired media include twisted pair, coaxial, optical fiber, any wired interface (e.g., USB, Firewire, Ethernet, etc.). The term Ethernet network is defined as a network compatible with any of the IEEE 802.3 Ethernet standards, including but not limited to 10Base-T, 100Base-T or 1000Base-T over shielded or unshielded twisted pair wiring. The terms communications channel and link are used interchangeably. A packet failure, when used in the context of the adaptive frequency hopping scheme of the present invention incorporated in a communications device, is defined not as an event in which the payload was erroneous, but as one in which a redundant portion of the packet at its boundaries was erroneous (i.e. header and/or trailer). The term multimedia player or device is defined as any apparatus having a display screen and user input means that is capable of playing audio (e.g., MP3, WMA, etc.), video (AVI, MPG, WMV, etc.) and/or pictures (JPG, BMP, etc.). The user input means is typically formed of one or more manually operated switches, buttons, wheels or other user input means. Examples of multimedia devices include pocket sized personal digital assistants (PDAs), personal media player/recorders, cellular telephones, handheld devices, and the like.

To aid in understanding the principles of the present invention, the adaptive frequency hopping mechanism of the present invention is described in the context of a Bluetooth system. In particular, the invention is used to detect interfered channels and utilize a channel reassignment scheme to minimize interference and collisions. Although the invention is applicable for use in and described in the context of a Bluetooth transceiver, it is appreciated that the invention is not limited for use solely in a Bluetooth environment. The adaptive frequency hopping scheme of the present invention can be used in other frequency hopping communication systems as well without departing from the scope of the invention. Other applicable systems include, for example, IEEE 802.15 compliant systems, Ultra wideband (UWB) and Multiband OFDM Alliance (MBOA) based systems. Further, the adaptive frequency hopping mechanism of the present invention can be incorporated in a communication device such a multimedia player, cellular phone, PDA, etc. Although the invention is described in the context of a cellular phone, it is appreciated that the invention is not limited to the example applications presented, but that one skilled in the art can apply the principles of the invention to other communication systems as well (both wireless and wired) without departing from the scope of the invention.

Some portions of the detailed descriptions which follow are presented in terms of procedures, logic blocks, processing, steps, and other symbolic representations of operations on data bits within a computer memory. These descriptions and representations are the means used by those skilled in the data processing arts to most effectively convey the substance of their work to others skilled in the art. A procedure, logic block, process, etc., is generally conceived to be a self-consistent sequence of steps or instructions leading to a desired result. The steps require physical manipulations of physical quantities. Usually, though not necessarily, these quantities take the form of electrical or magnetic signals capable of being stored, transferred, combined, compared and otherwise manipulated in a computer system. It has proven convenient at times, principally for reasons of common usage, to refer to these signals as bits, bytes, words, values, elements, symbols, characters, terms, numbers, or the like.

It should be born in mind that all of the above and similar terms are to be associated with the appropriate physical quantities they represent and are merely convenient labels applied to these quantities. Unless specifically stated otherwise as apparent from the following discussions, it is appreciated that throughout the present invention, discussions utilizing terms such as 'processing,' 'computing,' 'calculating,' 'determining,' 'displaying' or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention can take the form of an entirely hardware embodiment, an entirely software embodiment or an embodiment containing a combination of hardware and software elements. In one embodiment, a portion of the mechanism of the invention is implemented in software, which includes but is not limited to firmware, resident software, object code, assembly code, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium is any apparatus that can contain, store, communicate, propagate, or transport the program for use by or in connection with the instruction execution system, apparatus, or device, e.g., floppy disks, removable hard drives, computer files comprising source code or object code, flash semiconductor memory (USB flash drives, etc.), ROM, EPROM, or other semiconductor memory devices.

Mobile Device Incorporating the Adaptive Frequency Hopping Mechanism

Figure 4:
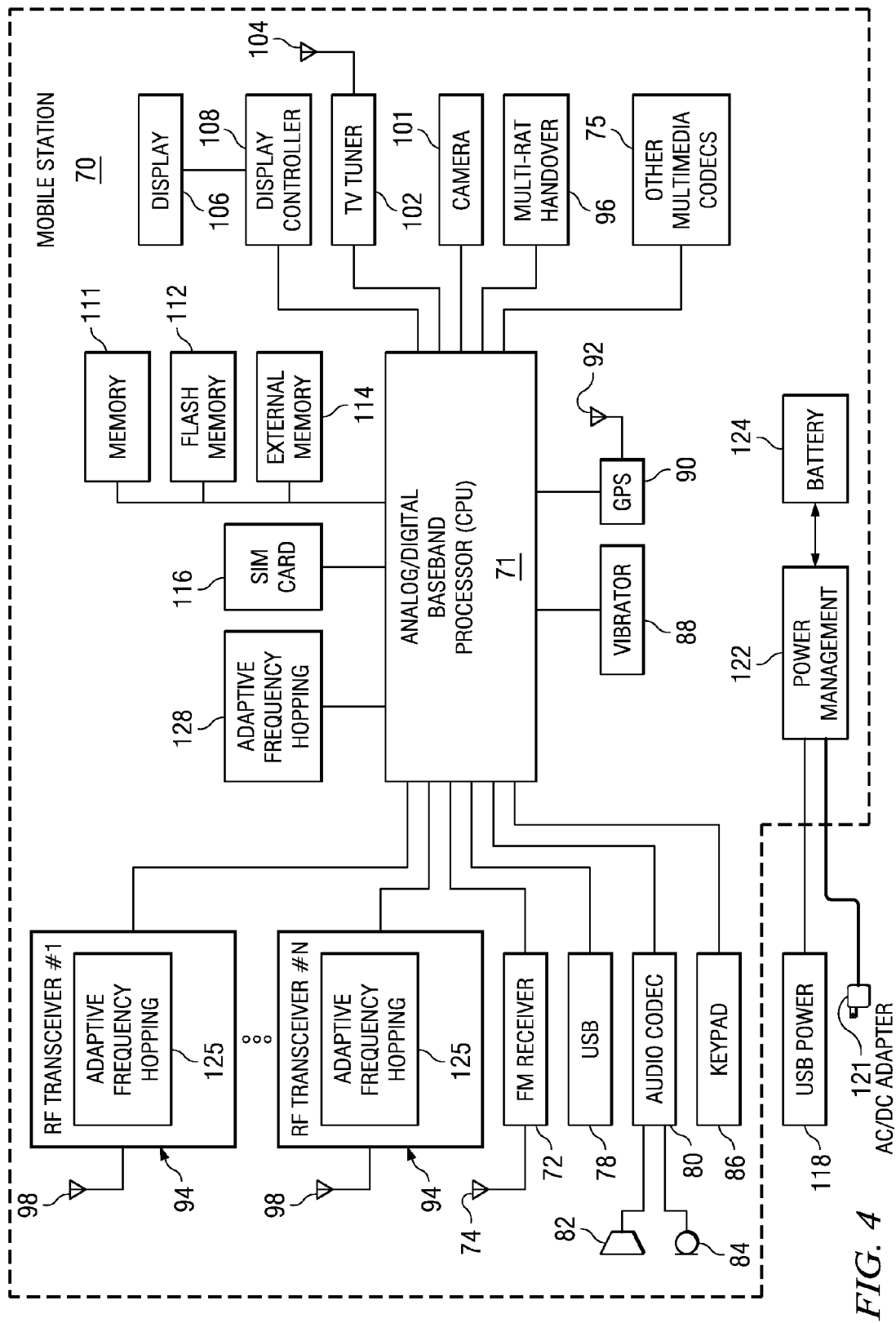
FIG. 4 is a block diagram illustrating an example communication device incorporating the adaptive frequency hopping mechanism of the present invention.

A general block diagram illustrating a communication device (shown generally as a mobile station or MS) incorporating the adaptive frequency hopping mechanism of the present invention is shown in FIG. 4. Note that the mobile station may comprise any suitable wired or wireless device such as multimedia player, mobile communication device, cellular phone, smartphone, PDA, Bluetooth device, etc. For illustration purposes only, the device is shown as a mobile station. Note that this example is not intended to limit the scope of the invention as the adaptive frequency hopping mechanism of the present invention can be implemented in a wide variety of communication devices.

The mobile station, generally referenced 70, comprises a baseband processor or CPU 71 having analog and digital portions. The MS may comprise a plurality of RF transceivers 94 and associated antennas 98. RF transceivers for the basic cellular link and any number of other wireless standards and radio access technologies (RATs) may be included. Examples include, but are not limited to, Global System for Mobile Communication (GSM)/GPRS/EDGE 3G; CDMA; WiMAX for providing WiMAX wireless connectivity when within the range of a WiMAX wireless network using OFDMA techniques; Bluetooth for providing Bluetooth wireless connectivity when within the range of a Bluetooth wireless network; WLAN for providing wireless connectivity when in a hot spot or within the range of an ad hoc, infrastructure or mesh based wireless LAN network; near field communications; 60 GHz device; UWB; etc. One or more of the RF transceivers may comprise a plurality of antennas to provide antenna diversity which yields improved radio performance. The mobile station may also comprise internal RAM and ROM memory 110, flash memory 112 and external memory 114.

Several user interface devices include microphone(s) 84, speaker(s) 82 and associated audio codec 80 or other multimedia codecs 75, a keypad for entering dialing digits 86, vibrator 88 for alerting a user, camera and related circuitry 100, a TV tuner 102 and associated antenna 104, display(s) 106 and associated display controller 108 and GPS receiver 90 and associated antenna 92. A USB or other interface connection 78 (e.g., SPI, SDIO, PCI, etc.) provides a serial link to a user's PC or other device. An FM receiver 72 and antenna 74 provide the user the ability to listen to FM broadcasts. SIM card 116 provides the interface to a user's SIM card for storing user data such as address book entries, etc. Note that the SIM card shown is intended to represent any type of smart card used for holding user related information such as identity and contact information, Authentication Authorization and Accounting (AAA), profile information, etc. Different standards use different names, for example, SIM for GSM, USIM for UMTS and ISIM for IMS and LTE.

The mobile station comprises adaptive frequency hopping blocks 125 which may be implemented in any number of the RF transceivers 94. Alternatively (or additionally), the adaptive frequency hopping block 128 may be implemented as a task executed by the baseband processor 71. The adaptive frequency hopping blocks 125, 128 are adapted to implement the adaptive frequency hopping and look ahead interference prediction mechanism of the present invention as described in more detail infra. In operation, the adaptive frequency hopping blocks may be implemented as hardware, software or as a combination of hardware and software. Implemented as a software task, the program code operative to implement the adaptive frequency hopping mechanism of the present invention is stored in one or more memories 110, 112 or 114 or local memories within the baseband processor.

Portable power is provided by the battery 124 coupled to power management circuitry 122. External power is provided via USB power 118 or an AC/DC adapter 120 connected to the battery management circuitry which is operative to manage the charging and discharging of the battery 124.

Consider that at least one of said RF transceivers 94 comprises a Bluetooth transceiver. As described supra, the Bluetooth transceiver uses frequency hopping for transmission and reception. Bluetooth transceivers use a time-division duplex (TDD) scheme to communicate, alternately transmitting and receiving in a synchronous manner. The piconet (i.e. the network of Bluetooth devices) is synchronized by the system clock of a master device. The Bluetooth Device Address (BD_ADDR) of the master determines the frequency hopping sequence and the channel access code. The system clock of the master determines the phase in the hopping sequence. The master controls the traffic on the channel by a polling scheme. The slaves adapt their native clocks with a timing offset in order to match the master clock.

The channel is represented by a pseudo-random hopping sequence hopping through all 79 RF channels or a modified limited hopping sequence which offers enhanced coexistence performance. The hopping sequence is unique for the piconet and is determined by the Bluetooth device address of the master; the phase in the hopping sequence is determined by the Bluetooth clock of the master. The channel is divided into time slots where each slot corresponds to an RF hop frequency. Consecutive hops correspond to different RF hop frequencies. The nominal hop rate is 1600 hops/s. All Bluetooth units participating in the piconet are time and hop synchronized to the channel.

Band Occupancy and Frequency Hopping Sequence Length

Figure 5:
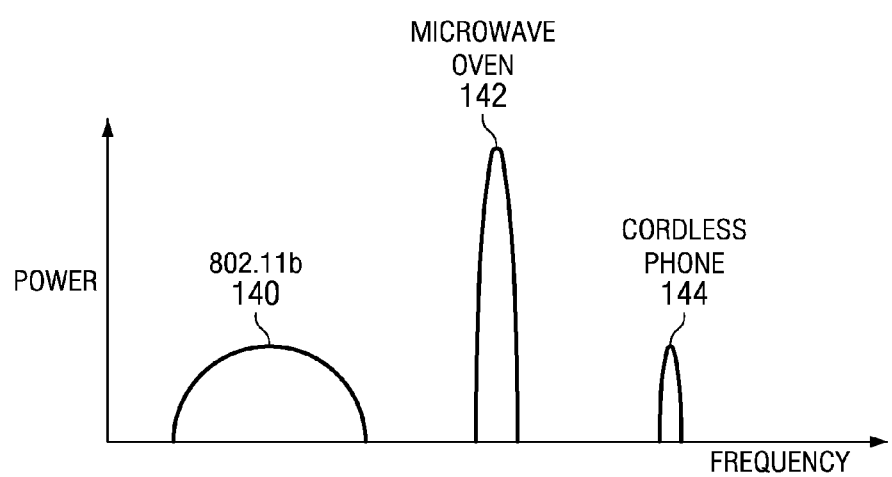
FIG. 5 is a diagram illustrating an example of band occupancy in the absence of a Bluetooth piconet.

A diagram illustrating an example of band occupancy in the absence of a Bluetooth piconet is shown in FIG. 5. The frequency spectrums of three devices or systems are shown, including an 802.11b WLAN 140, microwave oven emissions 142 and cordless telephones 144, all operating in the 2.4 GHz ISM band. As is apparent, these systems all operate in different areas of the spectrum and thus do not interfere with each other.

Figure 6:
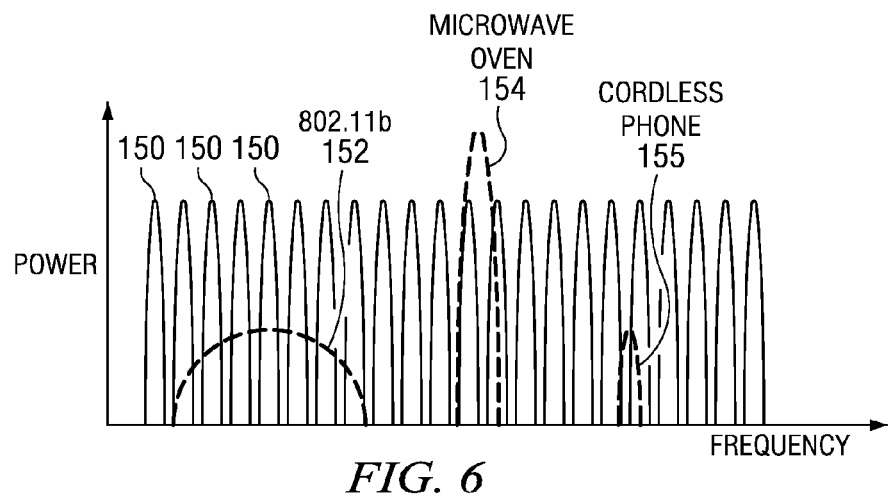
FIG. 6 is a diagram illustrating an example of band occupancy in the presence of a Bluetooth piconet.

A diagram illustrating an example of band occupancy in the presence of a Bluetooth piconet is shown in FIG. 6. In this example, a Bluetooth piconet is introduced with packet transmission occurring in 79 frequency hopping channels 150 (less than 79 channels shown for clarity) spread over the entire ISM band on top of the transmissions from the 802.11b WLAN 152, microwave oven 154 and cordless telephones 155 as previously shown in FIG. 5. Depending on the coexistence scenario (i.e. relative distances and signal levels), the Bluetooth system in this example can interfere with the WLAN and with the cordless phone and may suffer interference from them and from the microwave oven.

It is noted that the selection of the hopping sequence used in a frequency hopping radio is very important and has a direct impact on the performance of the system. The optimal properties of the hopping sequence should be considered carefully for any frequency hopping system. Some of the properties of an optimal hopping sequence to consider include: (1) the particular number of channels, (2) the frequencies selected for the hopping channels, (3) the order of the frequencies within the hopping sequence, and (4) the length of the hopping sequence, i.e. the hopping sequence cycle.

The optimal number of frequencies to be used should be carefully selected. If too many frequencies are used, a greater portion of the band used by the system will suffer interference from it, making it difficult to place other users of the band in clear portions of it. As an example, an 802.11b/g wireless LAN (WLAN) operating in the 2.4 GHz band will not be able to completely avoid a Bluetooth system that uses all 79 channels each having a 1 MHz bandwidth. In addition, a FHSS system is more likely to suffer interference from other users located in the band, if it is forced to use that many frequencies, whereas a lower number of adaptively selected frequencies would enable it to avoid interference.

On the other hand, if too few frequencies are used, potential frequency diversity gains (in terms of multipath fading) may be lost due to the fewer number of frequencies used. In addition, interference at a specific channel may be too high in terms of the resultant instantaneous packet error rate. Note, however, that the resultant performance degradation perceived by the user will vary and is application dependent. Further, it is more likely that a larger portion of the channels would experience interference simultaneously if too many frequencies are used, forcing them to be close in frequency.

Figure 7:
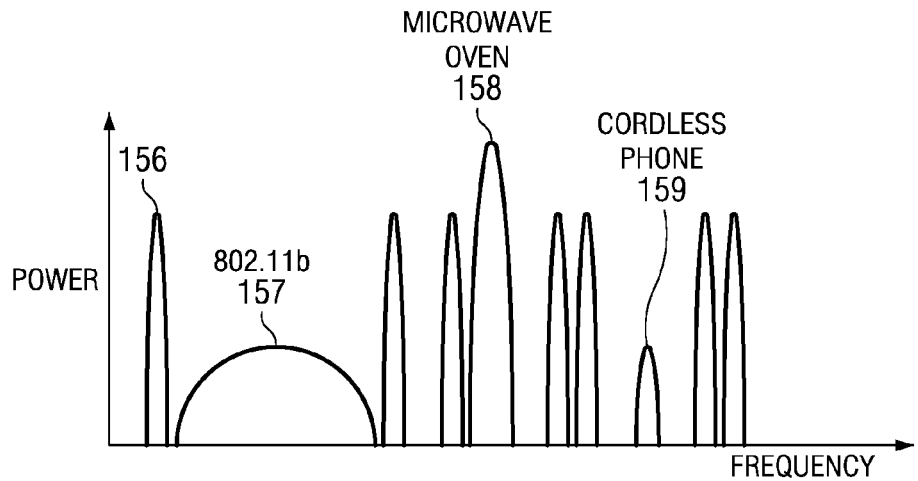
FIG. 7 is a diagram illustrating an example of band occupancy with a reduced number of Bluetooth hopping channels.

As an example, consider the band occupancy of FIG. 6. Reducing the number of hopping channels enhances coexistence with other systems, as shown in FIG. 7. The frequency spectrum comprises a reduced number of hopping channels 156, 802.11b WLAN 157, microwave oven leakage 158 and cordless telephone system 159. The Bluetooth hopping channels that interfered with these systems are removed with the result that the system performance of not only the Bluetooth system is improved but that of the other systems that coexist with it are improved as well.

Not only the number of frequencies, i.e. channels, should be considered but the frequencies used by the frequency hopping system must be considered as well. Spreading frequencies far apart from one another allows for better frequency diversity in the presence of multipath propagation and also in the presence of wideband interferers, which would then be less likely to interfere with multiple hopping channels simultaneously. The optimal frequency hopping channels are those that suffer the least amount of interference while simultaneously causing the least amount of interference to neighboring systems. It is important to note that interference could be local, i.e. affecting only one end of communication link. Thus, frequency use is not necessarily symmetric wherein each direction of a communication link may use a different frequency hopping sequence. Additionally, a system may be asymmetric in its sensitivity to interference, e.g., a wireless MP3 player, which occasionally acknowledges reception of data, is more sensitive in the direction where the digitized and compressed audio is transmitted.

Note, however, that it may be preferable in certain applications or scenarios not to use asymmetry in the selection of the channel hopping sequence. For example, it may not be noticed that one of the transmitter hopping frequencies interferes with another user unless the particular frequency is also used in the receiver hopping sequence and is interfered with by that user.

The particular order for the selected frequencies in the hopping sequence should also be considered. It is important to note that pseudo-randomness is not necessarily required to achieve "orthogonality" between two different hopping sequences which is intended to minimize mutual interference (i.e. the probability of collision). In addition, consecutive transmissions to a particular device should preferably be at distant frequencies in order to provide for frequency diversity and to reduce the probability of two consecutive packet failures. Further, strongly correlated (i.e. adjacent) frequencies used at both ends of a communication link, should preferably be used in consecutive (i.e. strongly correlated) transmit/receive time slots in order to more easily support antenna diversity in both directions (based on multiple antennas at one end only).

The optimal period or cycle time for the hopping sequence should also be considered. A shorter cycle period ensures faster acquisition of synchronization due to faster inquiry and establishment of a connection. A shorter cycle period also permits a faster adaptation in the presence of another frequency hopping device having the same slot timing and that implements the adaptive frequency hopping scheme of the present invention. Note that the shortest possible cycle period is equal to the number of hopping channels used (i.e., when M=1, where M denotes the number of occurrences of a particular frequency within the hopping cycle). Further, it is preferable that the number of hopping channels used be a prime number P so that if a certain type of device is served every k slots (i.e. hops), then all P channels would be used by that device before a channel is repeated, since P/k≠integer.

Figure 8:
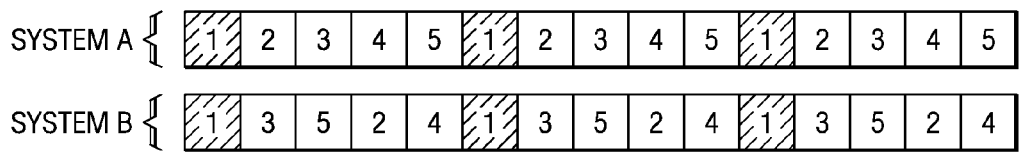
FIG. 8 is a diagram illustrating an example of short frequency hopping cycles in two closely situated wireless systems.

A diagram illustrating an example of short frequency hopping cycles in two closely situated wireless systems is shown in FIG. 8. In this example, both System A and System B use short cycles of five frequencies and five channel hops. The sequences, however, are different from each other but overlap on channel 1 during one slot each cycle (indicated by cross hatching). This results in repetitive collisions at the frequencies shared amongst the two coexisting frequency hopping systems (only one frequency in this example). In accordance with the present invention, these frequencies are replaced much quicker than if a longer cycle was employed. The quicker adaptation results in a reduced duration of interference and overall performance improvement.

Figure 9:
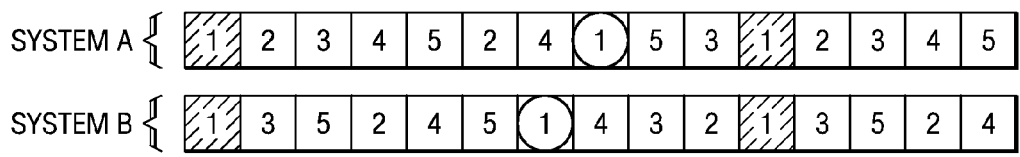
FIG. 9 is a diagram illustrating an example of long frequency hopping cycles in two closely situated wireless systems.
Figure 10:
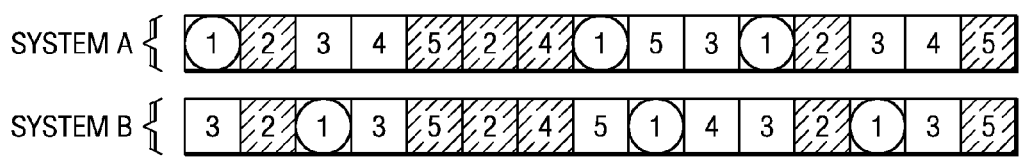
FIG. 10 is a diagram illustrating an example of long frequency hopping cycles in two closely situated wireless systems after some drift.

A diagram illustrating an example of long frequency hopping cycles in two closely situated wireless systems is shown in FIG. 9. Consider a long cycle (e.g., the cycle duration in Bluetooth is approximately 23 hours) for both System A and System B. Both systems have sequences comprising five frequencies and ten channel hops (i.e. M=2). As shown, the 'bad' frequency of channel 1 does not always experience a collision and thus will not be replaced as quickly. Note that collisions are indicated by cross hatching while non-collisions of channel 1 are indicated by the open circles. Further, the lower rate of collisions (2 out of 15) shown in FIG. 9 is temporary. Cycle drift, due to asynchronous clocks, causes the rate of collisions observed for channel 1 to vary over time, potentially not allowing enough repeatability to allow the adaptation mechanisms to establish that replacement if needed. The effect of clock drift on the longer cycle is shown in FIG. 10 where collisions are indicated by cross hatching while non-collisions of channel 1 are indicated by the open circles. The two systems of FIG. 9 are shown to eventually collide on 6 out of 15 frequencies after drifting into the relative timing shown in FIG. 10.

Note that the average rate of collisions for two unsynchronized systems using the exact same set of N frequencies is 1/N. The instantaneous collision rate, however, changes according to the hopping order of the frequencies in the coexisting hopping sequences. Note further that having an equally short cycle, combined with identical slot times (as is the case for Bluetooth) permits an increase in communication capacity through the use of shared frequencies, which are only replaced if cycle drift causes them to collide. Theoretically, two coexisting systems could use the exact same hopping sequence and would never collide as long as they remain staggered in their frequency use and have zero timing drift with respect to each other. The shortest cycle for a hop sequence is obtained when the sequence length is equal to the number of hopping channels (i.e. for M=1). This ensures that collisions at the shared frequencies of two systems of using that cycle length are repetitive (i.e. repeat on each hopping cycle), which results in much quicker replacement by the frequency replacement mechanism of the present invention described in more detail infra.

Adaptive Frequency Hopping Mechanism

Thus, the present invention proposes to use a minimal or fewer number of frequencies in the hopping sequence. Preferably, the number of frequencies (and hops) is a prime number. For example, in the case of Bluetooth systems in the 2.4 GHz ISM band, 23 channels are used instead of the 79 indicated by the standard. A reduction to 23 channels would reduce the utilization of the 83 MHz band to approximately 25%. In addition, use of the shorter cycle (23 slots compared with many hours) yields a significant improvement in coexistence performance in the presence of other systems of the same type. This is because, the use of the shorter cycle accelerates the rate at which a victim system is able to realize that a frequency is 'bad' and thus replace it with a different frequency much quicker. Coexisting systems would quickly stabilize on hopping sequences without any overlap, or would be able to better deal with shared frequencies once vacant frequencies are no longer available (such as in highly congested environments).

Figure 2:
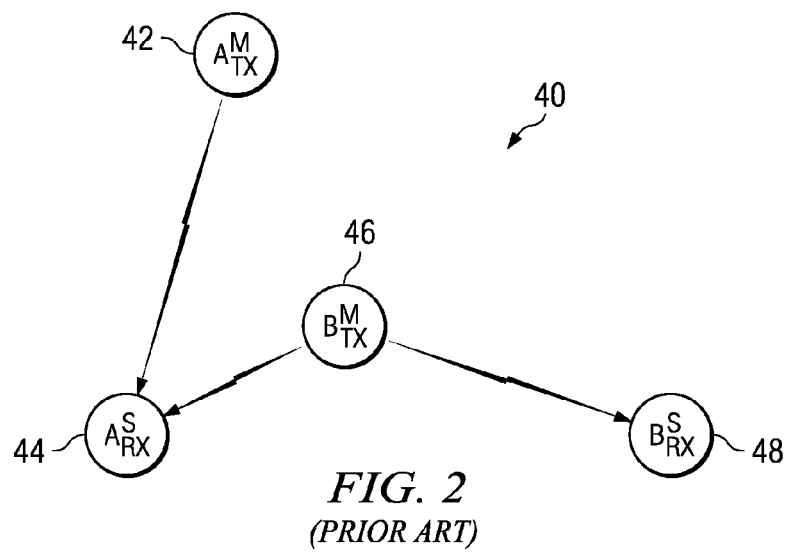
FIG. 2 is a diagram illustrating two similar wireless systems in close proximity to each other.
Figure 3:
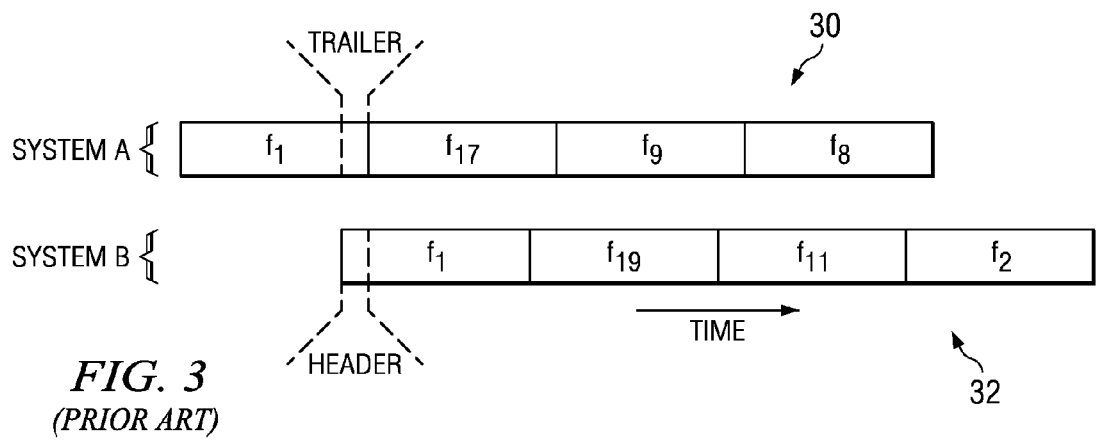
FIG. 3 is a diagram illustrating the channel frequency assignments of the two wireless systems of FIG. 2.

The use of the mechanism of the present invention allows systems to have an overlap in their frequency usage wherein collisions do not necessarily result in damage to the packet, such as data loss. A collision that does not result in damage to the packet is a partial collision wherein some header or trailer bits are lost. This is typically a 'don't care' situation as the bits in these fields are redundant. Further, only bits from one of two coexisting systems are typically lost. With reference to FIG. 2, consider the transmission of a packet from device 42 to device 44 and from device 46 to device 48. Due to the proximity of device 46 to device 44, the transmission of data from device 42 is interrupted. The transmission of data from device 42, however, does not affect reception at device 48 due to its distance from device 42. Thus, reception only at device 44 is affected.

Note that the mechanism assumes that the contents of the trailer field are not crucial to successful reception of the payload of the packet and their lost can be tolerated. In one example embodiment, the trailer field is either inserted into the packet (if not present already) or is lengthened to include redundant bits that are dedicated to detecting an overlap or collision between packets of coexisting systems. Thus, the trailer bits (or header bits) function to indicate whether or not a collision took place. If the mechanism is incorporated into a system that does not have dedicated trailer bits, the performance of that system would suffer somewhat (i.e. some data loss is possible) but the utility and usefulness of the invention remains. Thus, the mechanism of the invention can operate in systems that either do or do not include trailer/header bits, with the advantage of including trailer/header bits being operation of the invention without any data loss.

In accordance with the present invention, rather than make the hopping sequence longer (as is done in the prior art solutions), the hopping sequence is made shorter. A shorter hopping sequence aids systems that are coexisting with each other to 'learn' the hopping-pattern and avoid collisions. Overall, the adaptive frequency hopping mechanism achieves a higher capacity and better spectral usage through better frequency reuse.

The adaptive frequency hopping scheme provides a mechanism to (1) detect the instantaneous presence of interference on a particular channel and to (2) replace or swap the interfered channel with one that is clear for that particular time slot. The mechanism detects interference during a redundant portion of the transmission (i.e. header or trailer) without having to experience packet failures (i.e. data loss). If the interference impact (e.g., corrupted header/trailer bits) exceeds a predefined threshold, the channel is declared temporarily unusable and is replaced with another in accordance with a frequency replacement policy. An index referring to the unusable frequency may then be placed in a first-in-first-out (FIFO) memory buffer, such that it would be used only once all other available frequencies are exhausted (i.e. found unusable or must be avoided based on other information available to the system).

Adaptive Frequency Hoping—Method #1

Figure 11:
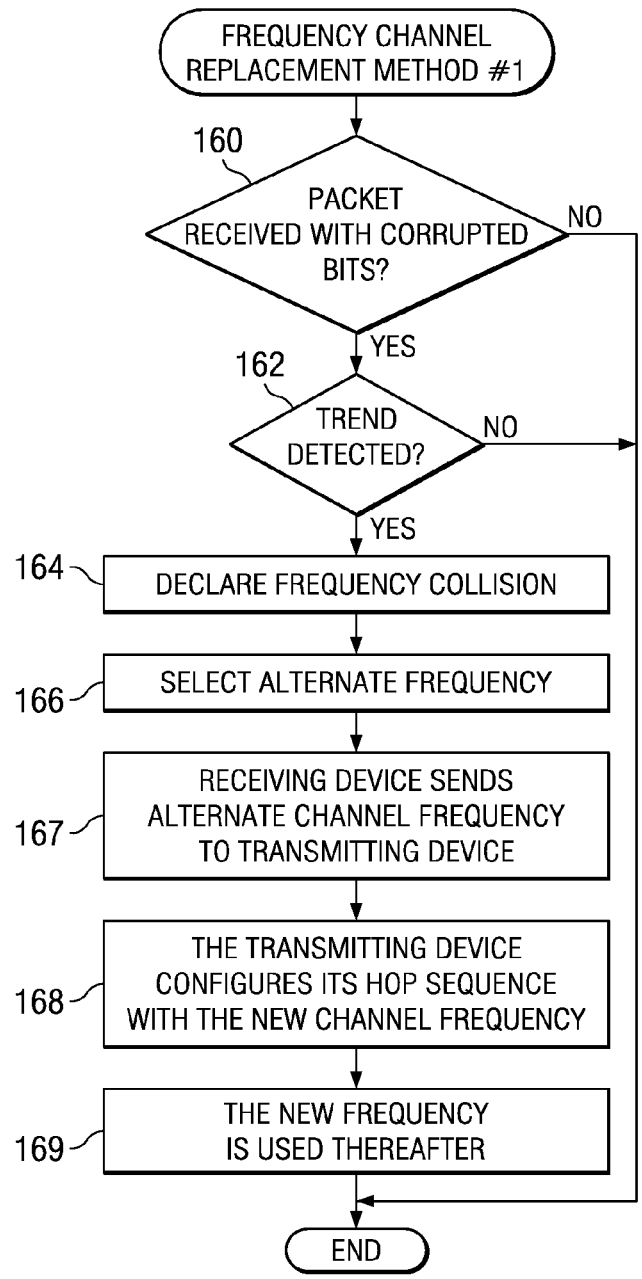
FIG. 11 is a flow diagram illustrating a first example method of the adaptive frequency hopping scheme of the present invention.

A flow diagram illustrating a first example method of the adaptive frequency hopping scheme of the present invention is shown in FIG. 11. The mechanism is operative to detect when bits in either the trailer or header fields have been corrupted (step 160). In such a case, the bit corruption event is logged or stored until a sufficient number of such events have occurred which is defined as a trend. If a trend is detected (step 162), (e.g., the number of corrupted bit events exceeds a threshold) then a frequency collision is declared (step 164). The interfered device (i.e. master device in Bluetooth networks) selects an alternate frequency channel for that particular hop in the hopping sequence (step 166). The interfered device communicates the alternative frequency channel to the transmitting device (step 167). In response, the transmitting configures its hopping sequence with the alternate channel frequency (step 168). Thereafter, the new frequency is used in that particular time slot within the hopping sequence (step 169).

The invention includes a mechanism to determine whether trailer (or header) bits were corrupted. In one example embodiment, redundant bits in the trailer (or header) that are known to both communicating sides are used. The point at which a trend is declared (and resultant frequency collision) is programmable and may be set in accordance with the particular implementation of the invention. For example, a trend may be declared after 3, 4, 5 or any number of bits are found corrupted. Alternatively, a trend may be declared if the number of corrupted bits is found to increase over time, which may be caused by the clocks in the two devices drifting further apart from each other.

The receiver is operative to monitor the number of either header or trailer bits that are received corrupted. In response, the receiver determines that there is a coexisting system that is drifting into its timing, potentially resulting in interference due to on-frequency or adjacent-channel collisions. The receiver then determines that the frequency it is using in that particular time slot is also being used by the coexisting system (or a near-by frequency is used). The frequency for that time slot is then re-assigned and communicated to the other system. The next time that time slot in the sequence arrives, the new frequency is used.

In the case of a Bluetooth link, the existing redundancy in the packet header can be utilized, as one example embodiment of this invention. The interference situation is determined on the receiving side by counting the number of corrected errors in the packet header, which employs a ⅓ repetition error-correcting code. The errors in the header would not affect the packet integrity but effectively serve as an indication for the presence of an instantaneous interference.

In accordance with revision 1.2 of the Bluetooth radio specifications, the mechanism for reassigning the frequency is based on the master sending a Link Manager Protocol (LMP) command to the slave incorporating a map with usable/unusable channels (LMP_AFH message with AFH_Channel_Map parameter). The slave omits the unusable frequencies from the hopping sequence as a response. Note that in the Bluetooth link, the master side is responsible for performing the AFH calculations and sending the appropriate commands to the slaves. Using this mechanism, a channel is omitted from the hopping sequence until the master sends another LMP message with an indication that this channel can be used again. Note that this mechanism only enables/disables a channel from the hopping list (and does not reassign it to another time slot). In order to enable reassignment of a channel to another time slot, the master should send a new LMP message which includes a new phase offset in the hopping sequence. This should be done by a message denoted as 'LMP_clockoffset_change req'. Upon receiving this message, the Link Manager in the slave would change the clock-offset (a parameter called 'Koffset' in the Bluetooth specifications) to the desired value. This operation advances the counter of the frequency-hopping list and thus reassigns the frequency to another time slot.

Figure 12:
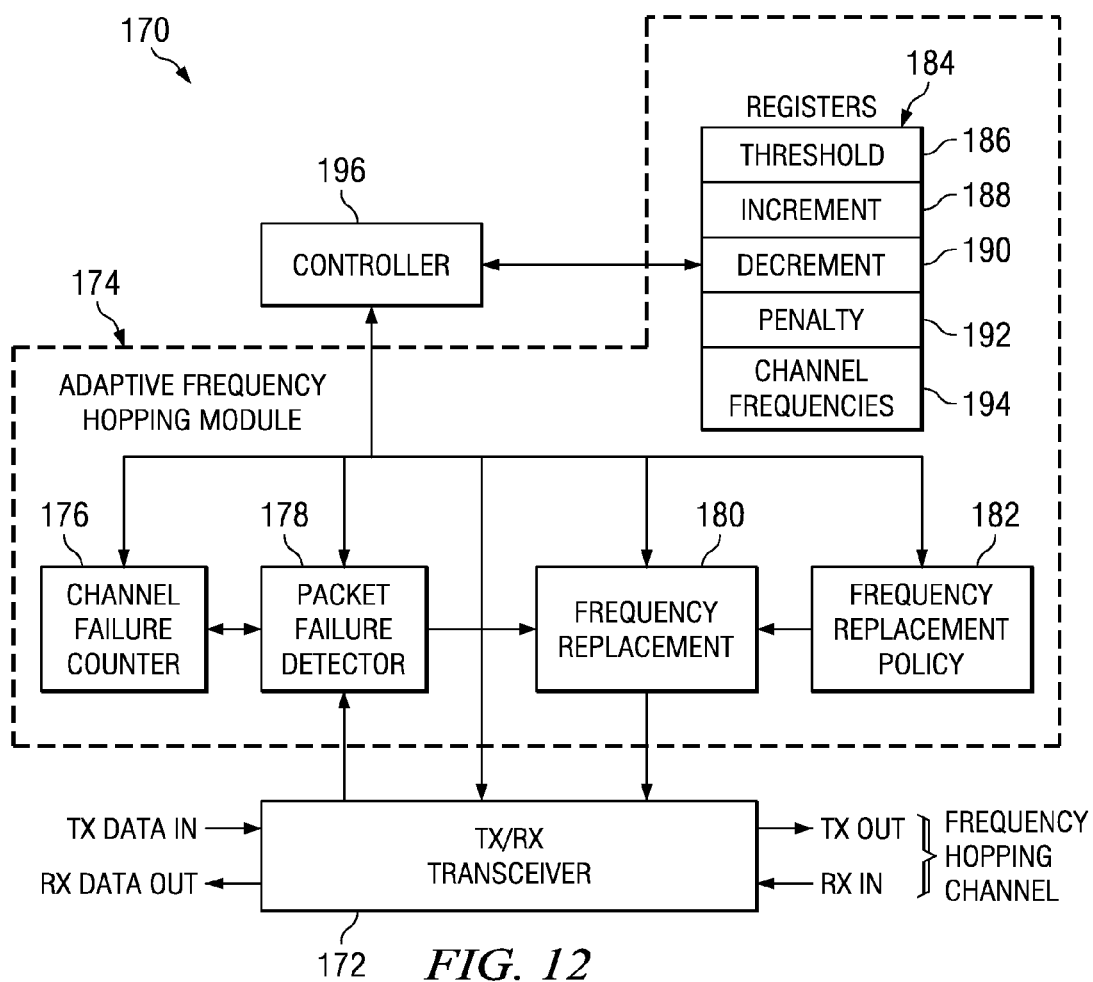
FIG. 12 is a block diagram illustrating an example embodiment of the adaptive frequency hopping scheme of the present invention.

A block diagram illustrating an example embodiment of the adaptive frequency hopping scheme of the present invention is shown in FIG. 12. The circuit, generally referenced 170, comprises a transceiver 172 (e.g., Bluetooth transceiver), controller 196, registers 184, channel failure counter 176, packet failure detector 178, frequency replacement block 180 and frequency replacement policy block 182. The register block 184 is read and written to by the controller and can be configured by external means such as an external host device. The register block stores the following entities used by adaptive frequency hopping scheme: threshold value 186, increment value 188, decrement value 190, penalty value 192 and channel frequencies 194.

The packet failure detector 178 is operative to detect packet failures. Packet failures are preferably detected in every device (including master and slaves) and the packet error rate (PER) for each frequency received by each device is monitored separately. A channel failure counter 176 keeps track of the current number of errors for each channel. Note that it is preferable to distinguish between packet loss due to propagation losses and that caused by interference (possibly based on RSSI), since each may require different treatment (e.g., for power control). The frequency replacement policy block 180 is programmable and thus can be set differently for different applications. Different applications may have different needs and thus can be set accordingly (e.g., voice applications are typically very sensitive and require fast adaptation to avoid noticeable voice quality degradation).

At the request of the packet failure detector, the frequency replacement block 180 initiates the frequency replacement process. Note that both the master and slaves are able to initiate a frequency replacement in their reception sequence (i.e. the hopping sequence used by the other party's transmitter). Further, the scheme can accommodate asymmetric use of frequencies, meaning each side of a connection may use different frequency allocations. This is helpful when the interference suffered at one end is not identical to that suffered at the opposite end.

The scheme may also use close frequencies in consecutive TX/RX time slots in order to better exploit antenna diversity in both directions based on a dual antenna radio in the master only (the optimal antenna for reception would also be the optimal one for transmission back to the same device).

The scheme uses distant frequencies in consecutive TX time slots to maximize frequency diversity. When an interfered channel needs to be replaced, a substitute frequency best satisfying the frequency diversity condition would be preferred to one that does not. When a channel is determined to be an interfered channel and is replaced, it is reused only once all or most other channels have been exhausted (i.e., selection is in a FIFO manner). Further, preferably only one frequency is replaced at a time, in order not to lose the connection as a result of a failure in conveying the details of the frequency replacement.

The following is a description of the contents of the register block 184 and channel failure counter 176. A separate channel failure counter is maintained for each frequency. The counter is incremented by the 'penalty' amount in addition to the 'increment' amount at the occurrence of a predetermined event (e.g., a repeated packet failure, or particularly strong interference) and by the 'increment' amount in the event of a regular packet failure. When the value of the counter exceeds the threshold value, the corresponding channel is marked as 'bad' and put into a 'need to be replaced' queue. The threshold value 186 is the minimal count that must be reached by the channel failure counter before a frequency replacement request is initiated for the corresponding channel. Note that the threshold value preferably corresponds to the desired quality of service (QoS), which is application dependent.

The increment value 188 is the number added to the channel failure counter when a packet failure is detected in its channel. The decrement value 190 is the number subtracted from the channel failure counter when a packet is successfully at that channel. The lower bound of the counter is zero. The penalty value 192 is the additional increment (i.e. penalty) that is added to the channel failure counter when a predetermined event occurs. The use of a penalty is intended to accelerate the replacement of those channels that are causing the more noticeable performance degradation in terms of user perception.

As an example of such a predetermined event, consider that two consecutive reception failures in a specific device (due to two consecutive interfered channels in the hopping sequence) could potentially be more harmful to certain applications (e.g., voice quality in a telephony device versus data throughput in file transfer). In such a case, it is desirable to improve the situation as quickly as possible by accelerating frequency replacement by reaching the threshold in fewer steps.

The mechanism of the present invention also provides for the accelerated replacement of those channels that cause more noticeable performance degradation or create interference to other users by detecting the occurrence of predetermined events, such as multiple consecutive reception failures, or by detecting a strong level of interference, which suggests that the coexisting system sharing that frequency may be within short distance and may be suffering interference as well. The invention serves to address both the need to coexist with systems of different spectral usage characteristics (e.g., fixed carrier frequency), as well as with systems employing frequency hopping with the same time-slotting and hop-sequence length, which is where it offers the most significant benefit. In the latter case, the impact on the redundant portion of an interfered packet (i.e. header or trailer) will be repetitive once an overlap scenario is entered. This allows for accelerated collision detection of high reliability based on a penalty parameter. The penalty parameter set for such a scenario accelerates the incrementing of the failure counter 176 by a predetermined amount thus accelerating the rate at which it would cross the predetermined threshold for frequency replacement.

When coexisting with a system of entirely different spectral usage properties, a shared frequency may be interfered with or become clear intermittently. A possible reason for this includes the different time-slotting schemes and transmission duty-cycles. In these cases the errors detected in the payload portion of the packet (e.g., based on a checksum or coding scheme) are of equal probability to those of the header and trailer since the unsynchronized interference may collide with any of these parts of the packet with equal probability. In contrast, in the scenario where the systems share the same frequency hopping parameters (e.g., time slotting and hop-cycle length) in accordance with the present invention, and the transmission timeslots are short with respect to time-constants associated with movements that affect the reception conditions, the collisions at the packet boundaries would occur first, whereby potential collisions corrupting the payload would be avoided for the most part by employing the techniques of the present invention. This interference scenario is therefore easily detected by comparing the integrity of the corrupted header or trailer with that of the rest of the packet.

Adaptive Frequency Hoping—Method #2

Figure 13:
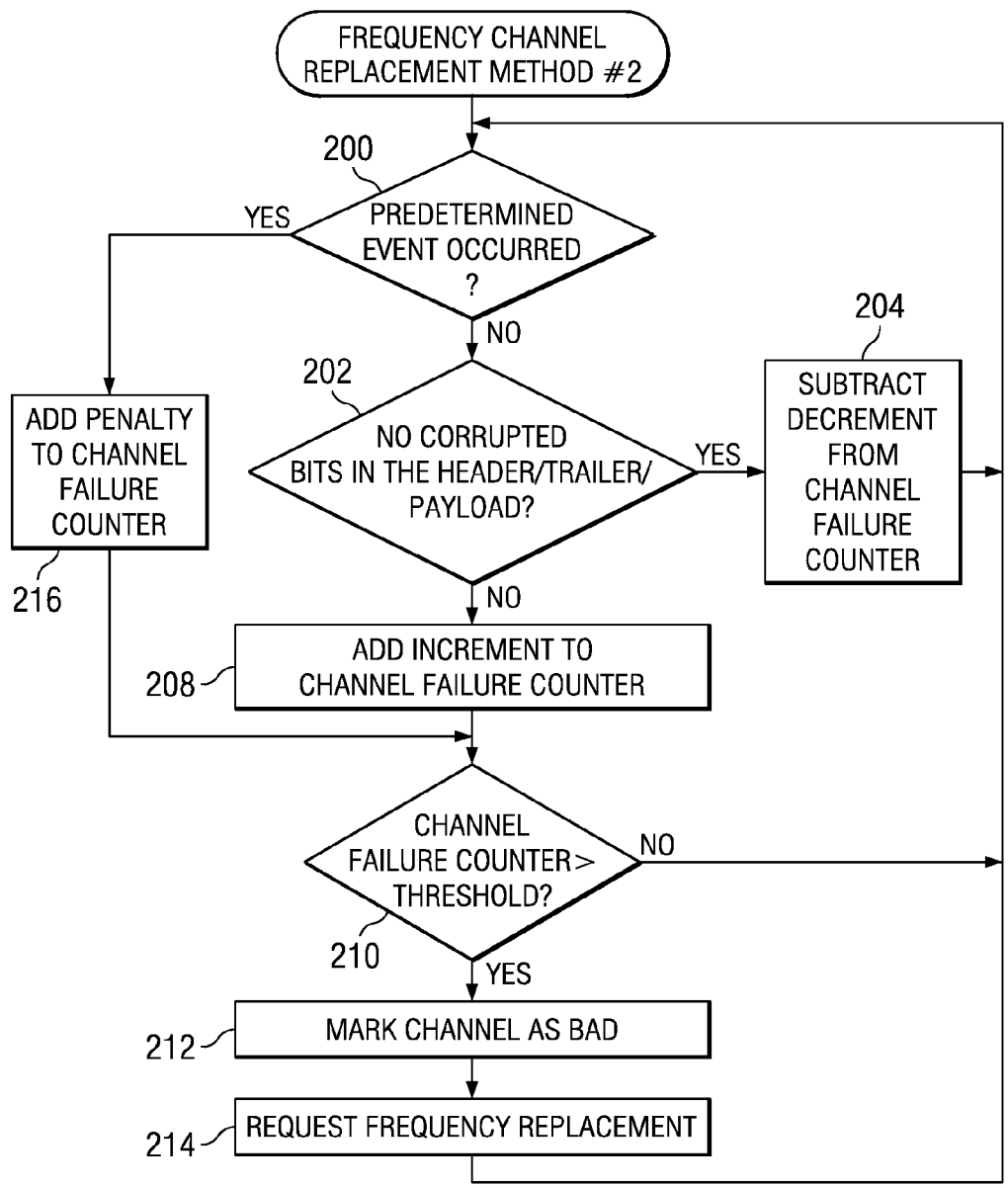
FIG. 13 is a flow diagram illustrating a second example method of the adaptive frequency hopping scheme of the present invention.

A flow diagram illustrating a second example method of the adaptive frequency hopping scheme of the present invention is shown in FIG. 13. It is first checked if a predetermined event has occurred (step 200), e.g., two or more consecutive reception failures. If such an event is detected, the penalty value is added to the channel failure counter (step 216). The method then continues with step 210. If such an event is not detected, it is checked whether any bits in the header/trailer or payload were corrupted (step 202). If not, the decrement value is subtracted from the channel failure counter (step 204) and the method returns to step 200.

If any bits were corrupted (step 202), the increment value is added to the channel failure counter (step 208). It is then checked if the channel failure counter exceeds the threshold (step 210). If it does not, the method returns to step 200. If it does, the channel is then marked as 'bad' (step 212), and the frequency replacement process is invoked (step 214). The interfered channel would then be replaced with a clear channel in accordance with the frequency replacement policy.

A frequency replacement message is generated comprising the number of the frequency to be replaced and the number of the new frequency to be used in its place. Note that the initiator of the frequency replacement message preferably replaces the frequency immediately after sending the message. The recipient of the message replaces the frequency immediately after receiving the message and sends an 'accepted' acknowledgement message back to the initiator.

The frequency replacement procedure is complete after successful receipt of the 'accepted' message, after which the next frequency replacement request can be sent. Note that the initiator does not initiate a second frequency change until the current frequency change procedure has completed. Assuming a hopset of 23 frequencies, during the replacement procedure, both parties continue to communicate using at least 22 frequencies. All 23 frequencies will be aligned once the process is complete. Since only one frequency change is performed at any one time, communications cannot be lost as a result of possible failure during the replacement process, thus ensuring robust communications. Note also that since the adaptive frequency hopping scheme can be asymmetric, the frequency replacement procedure for one particular channel within a communications device will affect the frequencies in one direction only (i.e. transmissions directed towards it, if the replacement was initiated by it).

Adaptive Frequency Hoping—Method #3

In addition to the two adaptive frequency hopping methods described supra, the present invention provides a third method. In this third method, upcoming periodic pulsed interference is detected before a collision can occur. This third method is to be distinguished from the previous method of comparing the integrity of the header/trailer with that of the payload, which may also be employed. For example, the reception duration of the receiver may be extended to start before the reception of the header and/or to end after the last bit in the trailer, to allow for the detection of energy from an interfering source that may occur at such timing and may be approaching the timing at which it would create interference in future cycles of the hop-sequence.

Figure 14:
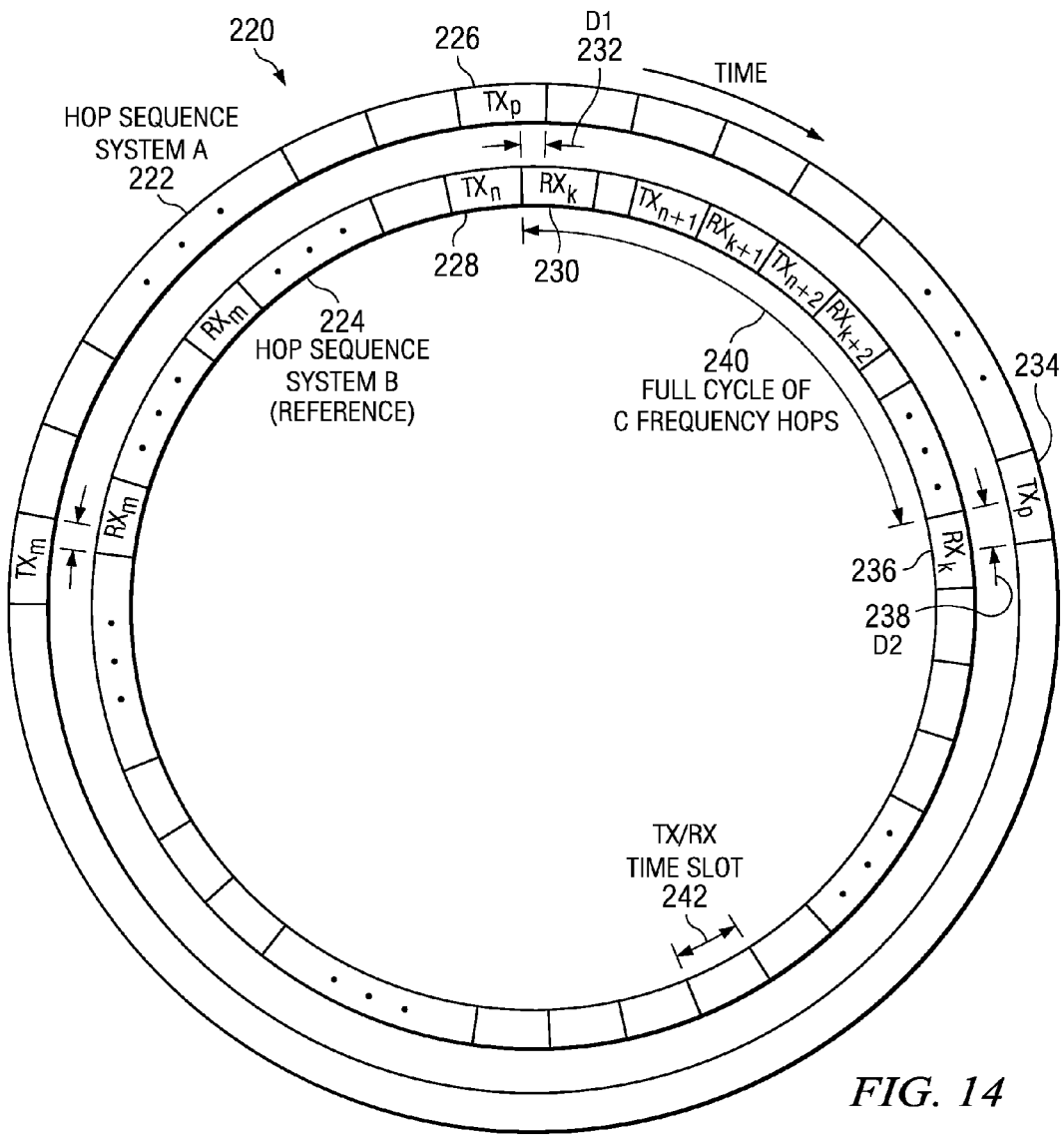
FIG. 14 is a diagram illustrating an example coexistence scenario between two similar uncoordinated frequency hopping systems.

A diagram illustrating an example coexistence scenario between two similar uncoordinated frequency hopping systems is shown in FIG. 14. The coexistence scenario, generally referenced 220, comprises two hopping sequence rings, the outer ring 222 representing the hopping sequence for System A and the inner ring 224 representing the hopping sequence for System B. The time axis increases in the clockwise direction. The depiction of these two systems as rings aids in understanding the periodic nature of the system.

Figure 15:
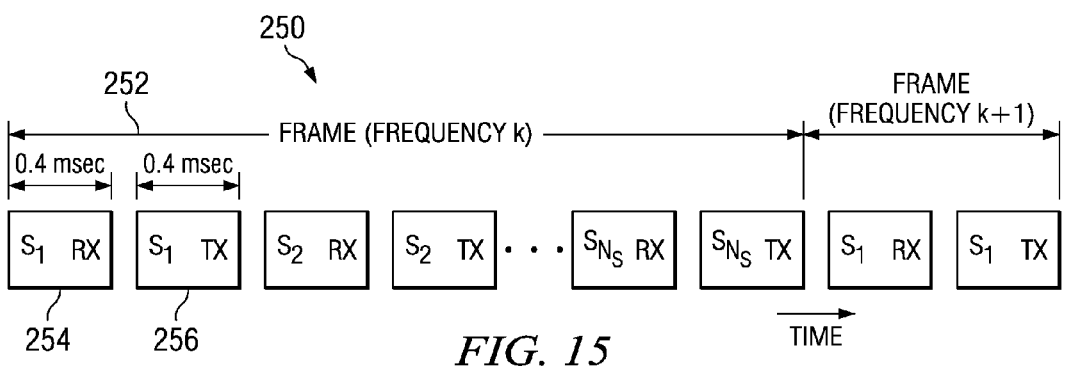
FIG. 15 is a diagram illustrating the frame structure used in the example coexistence scenario of FIG. 14.

A diagram illustrating the frame structure used in the example coexistence scenario of FIG. 14 is shown in FIG. 15. The example transmission stream, generally referenced 250, comprises a frame 252 wherein each frame further comprises a plurality of master transmissions 254 to the slaves and a plurality of slave transmissions 256 to the master. Note that only a single frame is illustrated, which includes the bidirectional communications of the master with all of the $N_S$ slaves it its piconet. Also shown are two consecutive master transmissions, which are shown as receive slots for the first slave, at two consecutive hop frequencies k and k+1, where $1 \leq k \leq C$.

Each transmission interval $T_{TX}$ to the slaves and reception $T_{RX}$ interval from the slaves represents a time slot and is 0.4 msec in duration with a guard time $T_G$ of 0.1 msec between each transmission. The number of transmissions in a frame is $2 \times N_S$ where $N_S$ is the number of slaves in the system. The total duration of a frame is therefore: $N_S \times (T_{TX} + T_G + T_{RX} + T_G)$. Note that the hop sequence is on a per-frame basis. Thus, the frequency k for a particular master-slave link changes every frame and not every time slot within the frame. Different frequencies may exist within a frame when the different slaves represented in it are using different hop sequences.

With reference to FIGS. 14 and 15, the diagram of FIG. 14 illustrates a coexistence scenario between two similar uncoordinated (i.e. asynchronous) frequency hopping systems in accordance with the present invention. The periodicity of frequency usage and the potential periodic collisions between the systems is illustrated by presenting the time domain as a ring rather than in linear fashion. System B (inner ring 224) is regarded as the interfered system and is represented in the Figure by a ring that contains an integer L number of hopping sequence cycles of length C each.

Note that the number of time slots in each hopping sequence cycle may be greater than 2·C, depending on the number of slots in a frame (considering TDD operation). For the sake of interference analysis, the rate of interest is the rate of interference progression $I_S$, defined in Equation 5 infra. Therefore, System B may be considered fixed (i.e. not rotating), while the rate of rotation for System A with respect to System B is shown in the Figure to be heading in a clockwise direction of increasing time. In the detailed example presented below, this rotation rate is calculated to be four symbols per hopping cycle, due to the assumed 20 ppm of frequency difference between the clock signals dictating the timing in each of the two systems, with the clock reference of system A being 20 ppm faster than that of System B.

Transmitted packet $TX_p$ 226 of System A, where p is an index in the range $1 \leq p \leq C$ representing the hopping channel $f_p$, which is the same frequency as $f_k$ (or close enough in frequency and strong enough in power to interfere with System B's reception at $f_k$), is shown to have overlap $D_1$ 232 with receive slot $RX_k$ 230 of System B, where $f_k = f_p$ is used, potentially corrupting the overlapped portion thereof. Since the direction of time drift of System A with respect to System B is clockwise, once a full hopping cycle of C frequencies is completed, the $TX_p$ packet 234 of System A is shown to have overlap with $RX_k$ 236 of System B again, but with wider overlap $D_2$ 238, where $D_2 > D_1$. The periodicity of these collisions is $C \times T_{FRAME}$, which is 25×8=200 msec according to Equation 3 in the example presented below. The mechanism of the present invention is operative to replace frequency k in that slot with a different frequency j, where $1 \leq j \leq C$, and $j \neq k$, sufficiently early enough in time before the additional collisions have greater overlap that result in transmission payload corruption. Note that additional adjacent frequencies suffering interference due to their proximity may be replaced as well. Replacing additional frequencies around the potentially interfered one minimizes any adjacent channel interference that could otherwise occur.

In this embodiment, only the difference in the rate of hopping between two systems is critical and not the absolute rate of hopping. One system, i.e. System B, is considered the reference system, while the timing of System A revolves around that of System B. Consider a system with 25 frequency hops in its sequence. Each master communicates with eight slaves bidirectionally (i.e. eight transmit time slots and eight receive time slots). Thus, after 400 time slots, the hop sequence returns to the same hop frequency. The time slots in FIG. 14, however, only show the transmissions between a single master and slave. Note that although the hop index for the communications between the master and a particular slave remains the same within a frame, a master may communicate with several slaves over different frequencies. In this case, there is still only one hop index change per frame for each slave. The difference in clock timing between the two systems is due to the use of crystals having different frequency errors which causes the timing between the two systems, although at the same nominal frequency, to drift apart over time. The width of the overlap intervals D1 and D2 in the example presented here widens with time, due to the crystal of System A being slightly faster than that of System B. Note that n, k, j, m and p denote a hop index number, which is typically a lookup index into a table or other data structure which translates to an actual frequency.

In FIG. 14, transmission $TX_p$ 226 of System A and reception $RX_k$ 230 of System B have independent indexes p and k respectively, which map to the same frequency. The overlap in time and frequency causes collision. Note that a problem only occurs when both system time slots share the same actual frequency or use a close enough frequency to cause interference. At the same point in the next cycle ($TX_p$ 234 and $RX_k$ 236) the overlap widens due to the faster System A clock.

The invention performs look ahead collision prediction by monitoring for transmissions of other systems some time before the time slot of interest. For example the system may look two time slots ahead. Note that the system may look ahead any amount and is not critical to the invention. Thus two time slots before the time slot of interest, the system 'listens' for the frequency of the time slot of interest that is coming up in the next two time slots (i.e. in the future). If it detects the same frequency that will be in the time slot of interest, it monitors and tracks the drift between the two systems, which can be measured using any suitable technique well-known in the art. If the system detects that the drift between the systems is growing, based on the timing of the detection of the potentially interfering transmissions, it estimates when in the future the collision between the victim time slot of interest and the potentially interfering system will likely occur. Before this time arrives, the system replaces the frequency with an alternate frequency, thereby avoiding any collision and preventing a degradation in capacity of the system.

Figure 16:
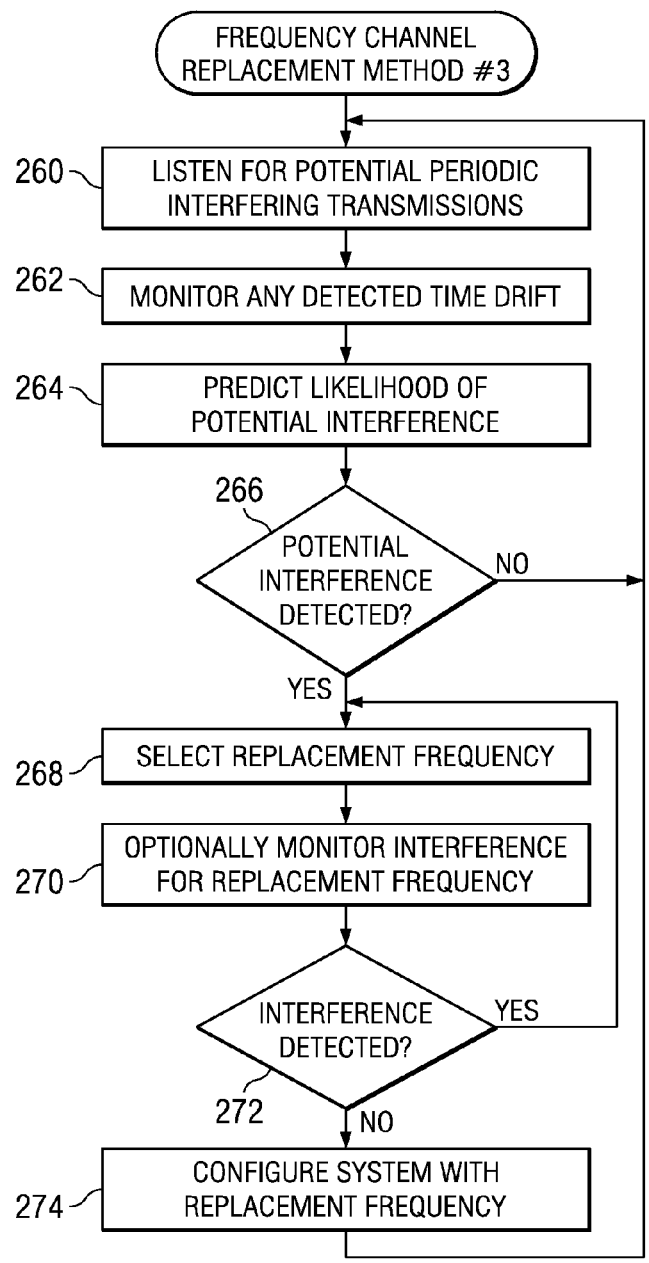
FIG. 16 is a flow diagram illustrating a third example method of the adaptive frequency hopping scheme of the present invention.

A flow diagram illustrating a third example method of the adaptive frequency hopping scheme of the present invention is shown in FIG. 16. With reference to FIGS. 14, 15 and 16, the look ahead interference prediction capability of the third method is especially useful in systems that do not have a sufficiently long header and/or trailer, and/or do not have sufficient redundancy in any of these, which is necessary for effective assessment of the integrity of the received header/trailer. Additionally, in this method, frequency replacement serves not only to protect the victim System B from potential interference originating from System A, but also ensures that System B would not potentially interfere with System A. Since the mutual interference may be asymmetric (i.e. System B could corrupt the reception of a packet within System A as a result of a collision without this resulting in noticeable corruption in the reception within System B), this prediction method, where the potential interference is evaluated in the absence of a collision, allows for better coexistence performance.

The receiver listens for potential periodic interfering or interfered frequencies (step 260). Any detected time drift is then monitored (step 262). The look ahead detection could be implemented, for example, using received signal strength indication (RSSI) envelope detection, without necessarily involving any demodulation in the receiver. Any suitable method of detection can be used and is not critical to the invention. Options for the receiver used for such interference detection include (1) using the receiver used for normal operation; or (2) using an auxiliary receiver such as when a receiver exists anyway and no additional hardware is necessary to accommodate the need. The second option may be the case, for example, when a WLAN transceiver is integrated with a Bluetooth transceiver in the same system, or when a second receiver chain exists for receiver diversity purposes.

Alternatively, if the guard time between the transmission and reception time slots does not permit sufficient extension of the reception duration, the interference detection may be performed during transmission of the preceding and/or following transmitted packet, even in a system where the transmitter and receiver share the same local oscillator (LO). This could be achieved by searching for energy at a frequency of $f_{IF}=f_{TX}-f_{RX}$ after the signal has been downconverted in the receiver by the LO, which is tuned to $f_{TX}$ during transmission. The frequency $f_{RX}$ represents the frequency of interest for which interference detection is of interest (i.e. typically, but not necessarily, the next frequency to be used in the hop sequence). While interference at $f_{RX}$ is being received and $f_{TX}$ is being produced in the single LO transceiver, the downconverted signal at the IF stage would be at $f_{IF}=f_{TX}-f_{RX}$, which may be beyond the width of the IF stage. If an increase in bandwidth is not feasible or cost effective, in order to accommodate such a feature, the construction of the hop sequence may be done while considering such limitation and ensuring that the frequencies in the RX hop sequence correspond to those of the TX hop sequences such that the frequency distances experienced during the look-ahead instances can be accommodated by the receiver's IF stage.

It is further noted that detection of interference during the reception of a desired packet may be based not only on the integrity of the received bits in the header/trailer/payload but also on steps detected in the RSSI. For example, an interfering packet that is 6 dB weaker than the desired signal it interferes with would still create a step in RSSI corresponding to about 1 dB, which would not occur equally abruptly as a result of movement. Naturally, an interfering signal that is much stronger than the victim signal it interferes with would create a much more noticeable step in the RSSI. Detecting the resultant RSSI step and distinguishing between it and the natural variations in RSSI occurring as a result of movement, can be based on recording the timing at which they occur within the received slot and monitoring how this timing repeats/drifts between consecutive packets, which indicates that it is indeed interference originating from a pulsed system using that particular frequency at the same periodicity, rather than RSSI changes occurring at random instances with respect to the timeslot boundaries as a result of movement/multipath-fading. The detection of interference may also be based on simultaneous demodulation of it, using joint-detection techniques well-known in the prior art.

It should also be noted that if the system has available idle timeslots or extended guard time at other instances that are further away from where a frequency of interest is to be used, detection of the use of this frequency by potentially interfering systems may still be beneficial, as it would provide predictive information of upcoming interference that might be suffered. For example, if the system has available receiver resources at a timing that is several or many time slots prior to when reception is scheduled at some frequency $f_{RX}$, it may detect such potential interference using any suitable technique and monitor its time drifting along consecutive detections of it as it is used periodically by the coexisting potentially interfering system. If the detection technique involves the demodulation of a standard header or training sequence, which is tightly associated with the time slot timing, accurate timing estimation for that system may be obtained. Based on the progression of the timing of such detected potential interference with time, the system may predict the upcoming collisions well before they occur (step 264) and, if potential interference is detected (step 266), schedules a replacement frequency ahead of such collisions in order to avoid any collision altogether (step 268). In a similar predictive manner, potential interference at that timing, for the frequency selected to be used as a replacement, may also optionally be monitored and established (step 270), such that if it is found to be occupied by a third coexisting system (step 272), a different replacement frequency may be chosen instead (step 268), otherwise the selected replacement frequency is configured (step 274).

To aid in understanding the principles of the invention, an example for the drift calculation of two similar uncoordinated (i.e. asynchronous) frequency hopping systems will now be presented with reference to FIGS. 14-15. Note that although the numbers presented below represent realistic scenarios, they are provided for example purposes only as other values may be used as well, depending on the particular system implementation.

The following parameters are defined:

$f_s$ symbol rate ($f_s$=1 Msps);

$T_s$ symbol time ($T_s$=1/$f_s$=1 μsec)

$b_H$ number of redundant bits in the header ($b_H$=16);

$b_T$ number of redundant bits in the trailer ($b_T$=16);

$N_f$ number of different hopping channels used in the hopping sequence ($N_f$=25);

C number of frequencies per cycle (cycle period) (C=25);

$T_{TX}/T_{RX}$ TX/RX time slot duration ($T_{TX}=T_{RX}$=400 μsec=0.4 ms);

$T_G$ guard time between consecutive TX/RX slots ($T_G$=100 μsec=0.1 ms);

$N_s$ number of slave devices in system ($N_s$=8);

δ maximal frequency error in Xtal based reference clocks (δ=±10 ppm);

Since in this example C=25, each frequency appears only once in a cycle. For C=50, at least one frequency must appear in more than one time slot. If all frequencies are to appear uniformly, then for C=50 each of the 25 frequencies would appear twice. The frame time, which is the time between hops in the transmission of the master to a particular slave, is the sum of the time slots and guard times for the communications with all slaves, which can be expressed as follows:

$$T_{FRAME}=N_s \times (T_{TX}+T_G+T_{RX}+T_G)=8 \times (0.4+0.1+0.4+0.1)=8 \text{ msec} \quad (2)$$

The cycle time (i.e. the total duration of a single hopping sequence) is expressed as $$T_c=T_{FRAME} \times C=8 \times 25=200 \text{ msec} \quad (3)$$

Maximum timing drift per cycle between two separate coexisting systems will exist when one has a +10 ppm error and the other has a −10 ppm error, such that there is a 20 ppm difference between their rates of hopping. In one hopping sequence, the greatest timing drift accumulated between the two systems would then be:

$$D_{max}=T_c \times 2\delta=200 \text{ ms} \times 20 \text{ ppm}=4 \text{ μsec} \quad (4)$$

The normalized rate of the progression of the interference, denoted $I_s$ and given in units of symbol time, is the number of additional interfered symbols per cycle of the hopping sequence and may be derived using the following simple ratio:

$$I_s=D_{max}/T_s=4 \text{ μsec}/1 \text{ μsec}=4 \quad (5)$$

The maximum number of hopping cycles for which interference may be experienced through symbol corruption in the header before reaching the payload is given as:

$$N_{IH}=b_H/I_s=16/4=4 \quad (6)$$

For example, the first occurrence of interference may impact two header symbols, the second would impact six symbols, the third would impact 10 symbols and the fourth would impact 14 symbols. A fifth collision, if allowed, would reach the payload, since the header in this example is only 16 symbols long.

The maximum number of hopping cycles for which interference may be experienced in the trailer, before its timing drifts into that of the payload, may be derived similarly. Since in this example the trailer also comprises 16 bits; $N_{IT}=N_{IH}$=4.

Thus, in order to prevent payload corruption, the system having the parameters of the example system presented herein would have to replace the frequency it uses in an interfered slot once four or less incidents of interference have been detected in its header or trailer (through symbol corruption, RSSI based detection and/or any other suitable detection means).

If reception/detection is possible during the guard times and/or during other time slots, such via the possible but not necessary use of a second receiver, then the drifting of an upcoming interferer may be established with sufficient time before a collision with the header or trailer would occur. This provides the system enough time to replace the potentially interfered frequency with one that is not in use around that timeslot. In such system, the header and trailer may be minimized while still being able to completely avoid payload corruption. The frequency replacement would normally take place before such a collision incident occurs, thereby maximizing the frequency capacity for the multi-system environment while minimizing the impacts of their coexistence.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of adapting a periodic frequency hopping sequence in a frequency hopping communication system having fixed slot timing, said method comprising the steps of:

detecting the presence of repeated interference at a particular frequency having specific timing with respect to time slots at which that particular frequency is periodically used by said system; and replacing the potentially interfered frequency of said time slot with a replacement frequency.

2. The method according to claim 1, wherein said step of detecting the presence of repeated interference comprises the steps of:
  detecting an impact on a received packet causing corruption of one or more bits in a redundant portion of said received packet; and
  declaring said particular frequency channel unusable if said impact exceeds a predefined threshold.

3. The method according to claim 2, wherein said redundant portion of said received packet comprises one or more trailer bits.

4. The method according to claim 2, wherein said redundant portion of said received packet comprises one or more header bits.

5. A method of adapting a periodic frequency hopping sequence in a frequency hopping communication system having fixed slot timing, said method comprising the steps of:
  detecting the presence of repeated interference at a particular frequency having specific timing with respect to time slots at which that particular frequency is periodically used by said system, wherein said step of detecting the presence of repeated interference comprises the steps of:
  detecting the presence of periodic transmissions from neighboring coexisting systems occurring at said frequency assigned to a time slot having specific timing with respect to said time slots at which this frequency is used by said system;
  determining a drift in the relative timing between said periodic transmissions and the timing at which said system periodically uses said frequency; and
  declaring said particular frequency unusable if the detected level of said periodic transmissions exceeds a predefined threshold and
  replacing the potentially interfered frequency of said time slot with a replacement frequency.

6. The method according to claim 5, wherein said repeated interference is detected before it causes any loss of payload data in said system.

7. A method comprising the steps of:
  adapting in an apparatus a frequency hopping sequence having a plurality of frequency channels by detecting an impact on a transmitted packet in a particular channel causing corruption of one or more bits in a redundant portion of said transmitted packet;
  declaring said particular channel unusable if said impact exceeds a threshold; and
  replacing the frequency of an unusable channel with an alternate frequency.

8. The method according to claim 7, wherein said redundant portion of said transmitted packet comprises one or more header/trailer bits which appear either before or after the payload in a packet.

9. The method according to claim 7, wherein potential periodic interference is detected without any loss of payload data.

10. A mobile communications device for use in a frequency hopping communication system having a plurality of frequency channels, comprising:
  a frequency hopping based radio transceiver;
  a processor coupled to said transceiver, said processor operative to:
  detect the presence of repeated interference at a particular frequency having specific timing with respect to time slots at which that particular frequency is periodically used by said transceiver; and
  replace the potentially interfered frequency of said time slot with a replacement frequency.

11. The mobile communications device according to claim 10, wherein said frequency hopping based transceiver comprises a Bluetooth transceiver.

12. The mobile communications device according to claim 10, wherein said processor is further operative to:
  replace said potentially interfered frequency by detecting the interference impact in a received packet through its corruption of one or more bits in a redundant portion of said packet; and
  declare said particular frequency channel unusable if said interference impact exceeds a predefined threshold.

13. The mobile communications device according to claim 10, wherein said processor is further operative to:
  replace said potentially interfered frequency by detecting the presence of periodic bursty transmissions from other coexisting systems occurring at said frequency at specific timing with respect to said time-slots at which this frequency is used by said system;
  determine the drift in the relative timing between said periodic transmissions and the timing at which said system periodically uses said frequency; and
  declare said particular frequency channel unusable if the detected level of said periodic transmissions, which can potentially create interference once their timing drifts into that at which said frequency is used by the system, exceeds a predefined threshold.

14. The mobile communications device according to claim 10, wherein the presence of said repeated interference is detected before it causes any loss of payload data in said device.

15. A method of adapting a periodic frequency hopping sequence in a frequency hopping communication system having fixed slot timing, said method comprising the steps of:
  detecting the presence of potential periodic interference from transmissions by neighboring coexisting systems occurring at a frequency assigned to a time slot to occur in the future in the potentially interfered system and having specific timing with respect to time slots at which the frequency is used by said system;
  determining a drift in relative timing between said periodic transmissions and the timing at which said system periodically uses said frequency; and
  declaring said particular frequency unusable if the detected level of said periodic transmissions repeatedly exceeds a first predefined threshold, and replacing said unusable frequency with a replacement frequency.

16. The method according to claim 15, wherein said potential periodic interference is detected before it causes any loss of payload data in said system.

17. The method according to claim 15, further comprising the step of detecting the presence of potential periodic interference from transmissions by neighboring coexisting systems occurring at said replacement frequency, such that the potentially interfered frequency would not be replaced with another potentially interfered frequency.

18. The method according to claim 17, further comprising the step of selecting a second replacement frequency if the level of periodically detected interference at said second replacement frequency exceeds a second predefined threshold.

* * * * *